United States Patent
Bloch et al.

(10) Patent No.: US 10,800,091 B2
(45) Date of Patent: Oct. 13, 2020

(54) AUTOMATED SYSTEM AND METHOD FOR SMOOTHING WRINKLED MATERIAL

(71) Applicant: The Boeing Company, Chicago, IL (US)

(72) Inventors: Daniel David Bloch, St. Peters, MO (US); Samuel Joseph Easley, St. Peters, MO (US); Frederick Coleman Wear, St. Louis, MO (US); Michael Brian Gedera, Creve Coeur, MO (US); Nicholas Lee Buelow, St. Louis, MO (US); Alan Frank Tegeler, O'Fallon, MO (US); William John Keyes, St. Charles, MO (US); Joshua Bryan Reando, DeSoto, MO (US)

(73) Assignee: The Boeing Company, Chicago, IL (US)

( * ) Notice: Subject to any disclaimer, the term of this patent is extended or adjusted under 35 U.S.C. 154(b) by 203 days.

(21) Appl. No.: 15/984,057

(22) Filed: May 18, 2018

(65) Prior Publication Data

US 2018/0264710 A1 Sep. 20, 2018

Related U.S. Application Data

(62) Division of application No. 14/453,670, filed on Aug. 7, 2014, now Pat. No. 9,993,960.

(51) Int. Cl.
*B29C 53/18* (2006.01)
*B25B 11/00* (2006.01)
(Continued)

(52) U.S. Cl.
CPC ............ *B29C 53/18* (2013.01); *B25B 11/005* (2013.01); *B26D 7/018* (2013.01); *B26D 1/065* (2013.01); *B29L 2007/002* (2013.01)

(58) Field of Classification Search
None
See application file for complete search history.

(56) References Cited

U.S. PATENT DOCUMENTS

| | | | |
|---|---|---|---|
| 3,797,341 A | 3/1974 | Bystron | |
| 4,444,078 A * | 4/1984 | Pearl | ..................... B25B 11/005 269/21 |

(Continued)

FOREIGN PATENT DOCUMENTS

| | | |
|---|---|---|
| BE | 4242373 A1 | 8/1993 |
| EP | 2574448 A1 | 4/2013 |
| GB | 2114043 A | 8/1983 |

OTHER PUBLICATIONS

Extended European Search Report, dated Jan. 12, 2016, regarding Application No. EP15180063.8, 6 pages.

(Continued)

*Primary Examiner* — Monica A Huson
(74) *Attorney, Agent, or Firm* — Yee & Associates, P.C.

(57) ABSTRACT

A method and apparatus for smoothing a material having wrinkles. The material is positioned on a vacuum table having a group of segments. A smoothing device is moved across a surface of the material to form a substantially smooth section of the material. A vacuum is progressively applied to a portion of the group of segments in the vacuum table corresponding to the substantially smooth section of the material to pull the substantially smooth section of the material against the vacuum table.

20 Claims, 20 Drawing Sheets

(51) Int. Cl.
  *B26D 7/01*  (2006.01)
  *B29L 7/00*  (2006.01)
  *B26D 1/06*  (2006.01)

(56) References Cited

U.S. PATENT DOCUMENTS

| | | | |
|---|---|---|---|
| 4,842,742 A * | 6/1989 | Plante | ..................... B29C 51/04 264/522 |
| 6,860,958 B2 | 3/2005 | Swafford et al. | |
| 2016/0039140 A1 | 2/2016 | Bloch et al. | |

OTHER PUBLICATIONS

European Patent Office Examination Report, dated Dec. 7, 2017, regarding Application No. 15180063.8, 5 pages.
Office Action, dated Jun. 30, 2017, regarding U.S. Appl. No. 14/453,670, 14 pages.
Final Office Action, dated Nov. 2, 2018, regarding U.S. Appl. No. 14/453,670, 5 pages.
Notice of Allowance, dated Jan. 29, 2018, regarding U.S. Appl. No. 14/453,670, 10 pages.

* cited by examiner

AUTOMATED SYSTEM AND METHOD FOR SMOOTHING WRINKLED MATERIAL

CROSS-REFERENCE TO RELATED APPLICATION

This application is a divisional of and claims the benefit of U.S. patent application Ser. No. 14/453,670, entitled "Automated System and Method for Smoothing Wrinkled Material," filed Aug. 7, 2014 and is incorporated herein by reference in its entirety.

BACKGROUND INFORMATION

1. Field

The present disclosure relates generally to manufacturing and, in particular, to materials used in manufacturing. Still more particularly, the present disclosure relates to an automated system and method for smoothing wrinkled material used in manufacturing.

2. Background

Layers of material are used for various applications. For example, without limitation, layers of material may be used to form structures, seal openings, rework surfaces, or for some other suitable purpose.

In some instances, two or more layers of material may be positioned relative to one another and joined together. For example, the layers of material may be cured, bonded, fastened, or attached to one another to form a structure. These layers of material may take the form of sheets.

A sheet of material may have various thicknesses, depending on the type and use of the material. For instance, a sheet of material may have a thickness ranging from about a fraction of a nanometer to a centimeter or more.

When working with sheets of material, eliminating wrinkles and folds is desirable. These wrinkles may inhibit bonding, predispose the material to tearing, or otherwise cause more inconsistencies than desired during use of the sheet. For example, if a sheet of material is not substantially smooth, a structure formed from the sheet of material may be formed with out of tolerance voids, porosity, or other inconsistencies. As another example, when reworking a surface, a wrinkled sheet of material may result in poor adhesion to the surface.

To reduce the risk of inconsistencies, a sheet of material may be smoothed prior to being used for its intended purpose. Some existing solutions require human operators to manually smooth each sheet of material. Oftentimes, these human operators smooth each sheet of material using their hands or handheld tools. This process takes countless labor hours to complete.

In addition, the human operators must be highly trained to smooth the sheet of material without tearing or otherwise altering the structural properties of the material. Finding highly skilled human operators may be more difficult and time-consuming than desired. Consequently, manufacturing processes using the material may cost more than desired. Therefore, it would be desirable to have a method and apparatus that take into account at least some of the issues discussed above, as well as other possible issues. Specifically, it is desirable to find a method and apparatus to more quickly smooth wrinkled material.

SUMMARY

In one illustrative embodiment, a method for smoothing a material having wrinkles is provided. The material is positioned on a vacuum table having a group of segments. A smoothing device is moved across a surface of the material to form a substantially smooth section of the material. A vacuum is progressively applied to a portion of the group of segments in the vacuum table corresponding to the substantially smooth section of the material to pull the substantially smooth section of the material against the vacuum table.

In another illustrative embodiment, an apparatus comprises a vacuum table, a smoothing device, and a vacuum system. The vacuum table has a group of segments. A material having wrinkles is positioned on the vacuum table. The smoothing device moves across a surface of the material to form a substantially smooth section of the material. The vacuum system progressively applies a vacuum to a portion of the group of segments in the vacuum table to pull the substantially smooth section of the material against the vacuum table.

In yet another illustrative example, a method for smoothing a material having wrinkles using an automated smoothing system is presented. The material having wrinkles is positioned on a vacuum table. The vacuum table has a group of segments. The material is clamped to the vacuum table using a clamping system. A smoothing device is translated across a surface of the material using a first movement system to form a substantially smooth section of the material. A vacuum is applied to a segment in the group of segments in the vacuum table immediately after the smoothing device translates across the surface of the material corresponding to the segment.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that it may be desirable to have an automated process for smoothing a wrinkled material before using it for various manufacturing processes. The illustrative embodiments recognize and take into account that using human operators to manually smooth the wrinkled material takes more time and resources than desired. In some cases, skilled workers are not available to perform such manual smoothing processes, which slows down manufacturing processes that need smoothed material.

The illustrative embodiments further recognize and take into account that it may be desirable to have an automated system for smoothing materials that is flexible based on the type and thickness of material being smoothed. For example, the illustrative embodiments recognize and take into account that different thicknesses and types of material may have different considerations during a smoothing process.

Moreover, the illustrative embodiments recognize and take into account that it may be desirable to have an automated system that can smooth a sheet of material without tearing the material. The illustrative embodiments recognize and take into account that as the thickness of the material decreases, the fragility of the material increases. As a result, smoothing thinner materials is particularly challenging and time-consuming.

Thus, the illustrative embodiments provide an automated system and method for smoothing a material having wrinkles. This material may be referred to as "material having wrinkles," "wrinkled material," a "wrinkled sheet of material," or a "wrinkled layer of material," throughout the illustrative examples.

In an illustrative example, the material is positioned on a vacuum table having a group of segments. A smoothing device is moved across a surface of the material to form a substantially smooth section of the material. A vacuum is progressively applied to a portion of the group of segments corresponding to the substantially smooth section of the material to pull the substantially smooth section of the material against the vacuum table. Each segment is activated immediately after the smoothing device passes over the surface of the material corresponding to that particular segment.

Figure 1:
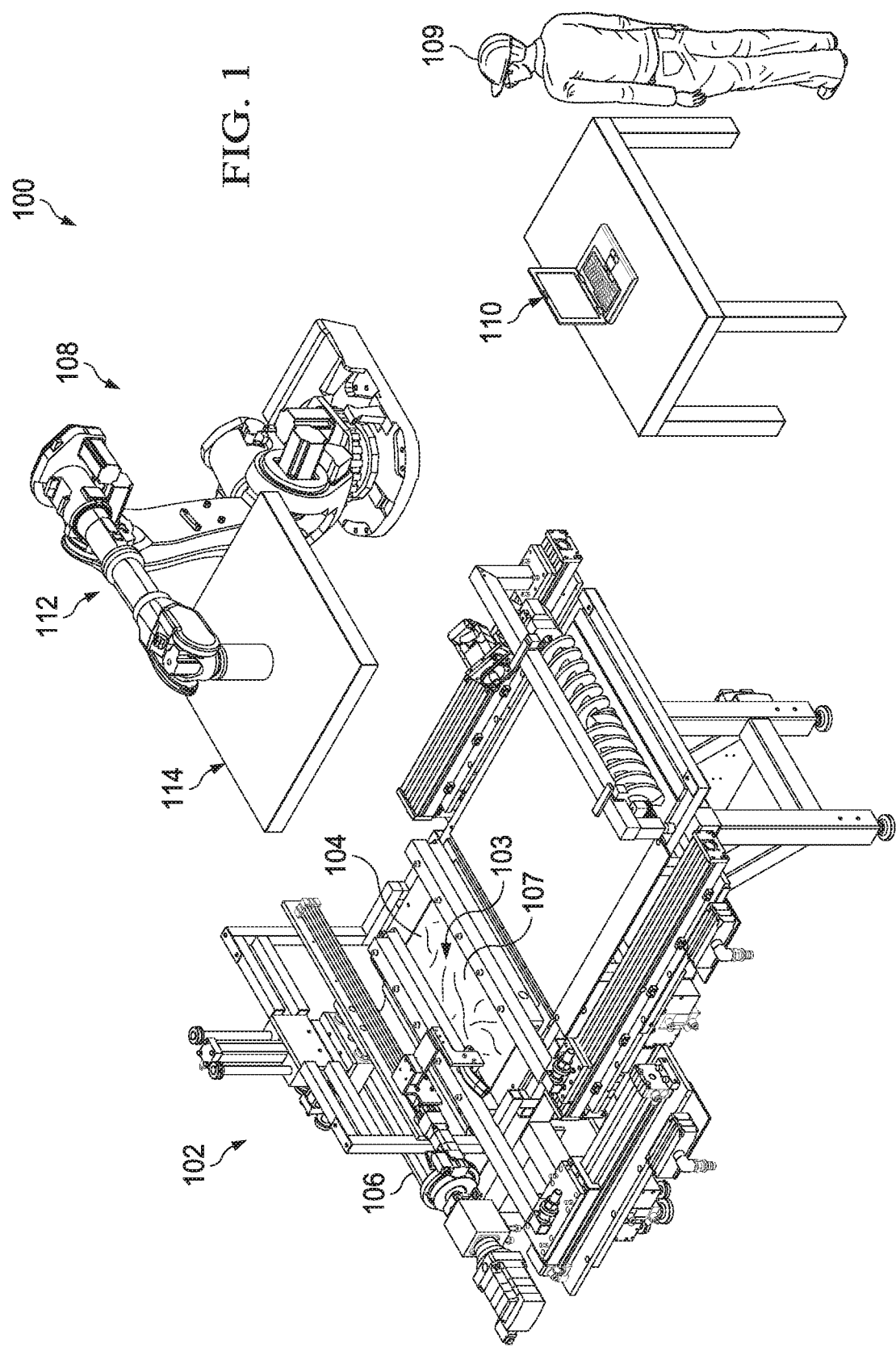
FIG. 1 is an illustration of a manufacturing environment in accordance with an illustrative embodiment.

Turning next to FIG. 1, an illustration of a manufacturing environment is depicted in accordance with an illustrative embodiment. In this depicted example, manufacturing environment 100 is an environment in which automated smoothing system 102 is used to smooth material 103 having wrinkles 104.

As depicted, material 103 may include a number of layers of material in this illustrative example. As used herein, a "number of" items is one or more items. Thus, a number of layers is one or more layers. In this particular example, material 103 is a single layer of material.

Material 103 also may have various thicknesses. In some cases, material 103 may be a thin film material. When material 103 is a thin film material, material 103 may have a thickness of about a fraction of nanometer to about several hundred micrometers. In other illustrative examples, material 103 has a thickness outside this range.

In this illustrative example, material 103 may comprise a number of different types of materials. For example, material 103 may comprise at least one of a metal, a polymer, or some other suitable type of material.

As used herein, the phrase "at least one of," when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required.

For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

In this depicted example, material 103 has a rectangular shape with surface 107. Material 103 may have other shapes in other illustrative examples. For instance, material 103 may have a square shape, an oval shape, a triangular shape, an irregular shape, a hexagonal shape, or various other shapes. Automated smoothing system 102 may smooth material 103 regardless of its shape.

Material 103 may be stored on roll 106. In an illustrative example, material 103 may be unrolled from roll 106 with surface 107 facing upwards. In other instances, material 103 may take the form of a sheet that is positioned relative to automated smoothing system 102 in some other manner, depending on the particular implementation.

In this depicted example, automated smoothing system 102 forms a substantially smooth sheet of material 103. A number of different components in automated smoothing system 102 are used to smooth material 103 in a desired manner.

After the smoothing process is completed, the material may be referred to as a "smoothed sheet of material," "smoothed material," a "substantially smooth sheet of material," and so forth. In each case, wrinkles 104 and undesired folds in the material have been reduced or eliminated by automated smoothing system 102.

In this illustrative example, manufacturing environment 100 also includes transport device 108, human operator 109, and controller 110. In this illustrative example, transport device 108 picks up and moves the substantially smooth sheet of material 103 from one location to another location.

Transport device 108 takes the form of a robotic device in this illustrative example. Arm 112 with end effector 114 of transport device 108 is used to transport material 103. In this manner, transport device 108 transports the material to another location for further processing.

In other instances, transport device 108 may take a different form than shown in this view. For example, transport device 108 may include at least one of a human operator, a manual device, a gantry system, or some other suitable tool configured to pick up and move material from one location to another location while maintaining the substantially smooth character of the material.

Human operator 109 is present in manufacturing environment 100 in this illustrative example. However, human operator 109 is not manually performing smoothing operations on material 103. Instead, the smoothing process is entirely automated in this illustrative example. In other words, material 103 is smoothed without intervention from human operator 109. In some instances, human operator 109 may perform other operations simultaneously with automated smoothing system 102 and transport device 108, but the presence of human operator 109 is unnecessary in this illustrative example.

As illustrated, controller 110 may control operation of at least one of automated smoothing system 102 or transport device 108. Controller 110 may communicate with an on-board controller on either device (not shown in this view) to coordinate operation of automated smoothing system 102, transport device 108, or both. This coordinated operation may include positioning, feedback, instructions, and other control processes prior to, during, and after smoothing occurs. For instance, concurrent processing may be employed.

Once material 103 is smoothed within selected tolerances, transport device 108 quickly transports the smoothed sheet out of the work area. Almost immediately, automated smoothing system 102 may begin smoothing another portion of material 103 having wrinkles. For example, more of material 103 may be unrolled from roll 106. As a result, smoothing and transport of the material may be completed more efficiently than with some currently used systems.

Figure 2:
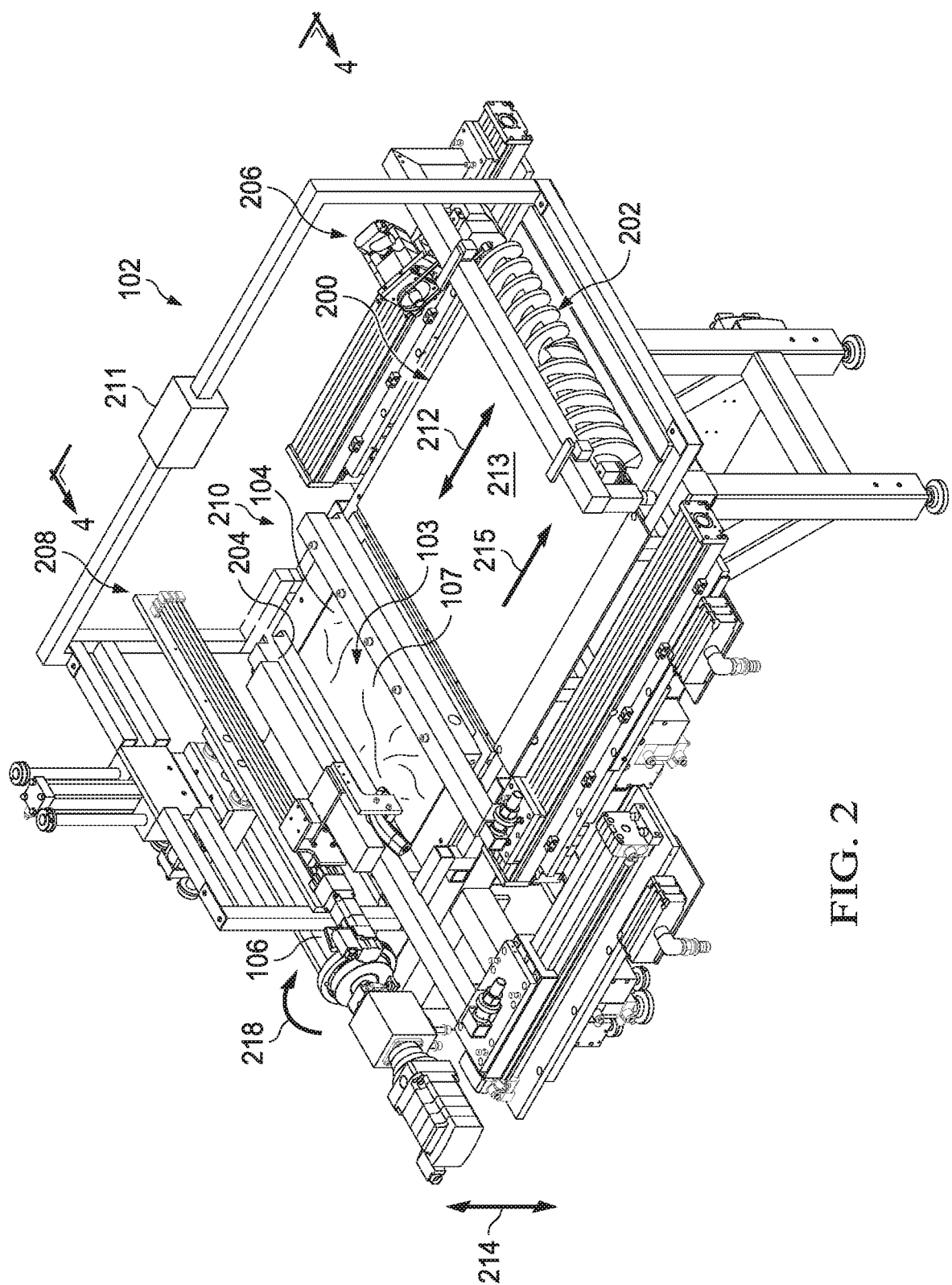
FIG. 2 is an illustration of an automated smoothing system in accordance with an illustrative embodiment.

With reference next to FIG. 2, an illustration of an automated smoothing system is depicted in accordance with an illustrative embodiment. In this depicted example, an enlarged view of automated smoothing system 102 from FIG. 1 is shown.

Automated smoothing system 102 includes a number of different components in this illustrative example. In particular, automated smoothing system 102 includes vacuum table 200, smoothing device 202, clamping system 204, sensor system 206, cutting system 208, unrolling tool 210, and vision system 211.

As illustrated, material 103 is positioned on vacuum table 200. Vacuum table 200 is a platform that provides structural support for material 103 as material 103 is smoothed. A vacuum system (not shown in this view) is used to pull material 103 against vacuum table 200 immediately after smoothing device 202 moves over surface 107 of material 103 corresponding to a vacuum segment in vacuum table 200. Although vacuum table 200 is shown as a flat structure, vacuum table 200 may be curved in some illustrative examples.

Vacuum table 200 may include porous material 213 in this illustrative example. When material 103 is positioned for a smoothing operation, porous material 213 is positioned directly under material 103. Porous material 213 is a material comprising voids, or pores. The material selected for porous material 213 allows air to travel through the voids such that a vacuum can be applied to material 103. When a vacuum is applied, material 103 is pulled against porous material 213 in vacuum table 200.

Additionally, in some illustrative examples, air may be blown through porous material 213 to separate material 103 from vacuum table 200 once smoothed. In still other illustrative examples, porous material 213 may be a type of material that contains holes or other manufactured openings. In some illustrative examples, porous material 213 may be a porous paper material. In some other examples, porous material 213 may be a woven polymeric material. In yet other examples, porous material 213 may be a metallic material with holes throughout.

In this illustrative example, smoothing device 202 includes a number of features used to remove wrinkles 104 from surface 107 of material 103. For example, smoothing device 202 may include a brush, an air knife, or other suitable devices to remove wrinkles 104 from material 103.

Smoothing device 202 moves back and forth in the direction of arrow 212. As an example, smoothing device 202 may move across surface 107 of material 103 from one part of material 103 to another part to form a substantially smooth section of material 103. In one illustrative example, smoothing device 202 may move across surface 107 of material 103 from a clamped end of material 103 to a free end of material 103 to form a substantially smooth section of material 103. The clamped end may be a part of material 103 held in place by clamping system 204.

The number of features of smoothing device 202 touches surface 107 as it moves. For example, when the number of features is an air knife, air from the air knife may touch surface 107 as smoothing device 202 moves. When the features are a brush, the brush may touch surface 107 as smoothing device 202 moves. The force provided by and movement of smoothing device 202 along surface 107 removes wrinkles 104 from material 103.

In this depicted example, smoothing device 202 also moves up and down in the direction of arrow 214. After the smoothing process is completed, smoothing device 202 may be lifted and retracted back to a starting position to smooth the next wrinkled section of material 103 positioned on vacuum table 200.

Clamping system 204 applies a force against material 103 to hold material 103 in place. As depicted, clamping system 204 includes a number of devices to clamp material 103 to vacuum table 200 and hold material 103 against vacuum table 200 while smoothing device 202 moves across surface 107 of material 103 to remove wrinkles 104. In this manner, clamping system 204 temporarily secures material 103 as operations are performed by components in automated smoothing system 102.

Clamping system 204 also may move in the direction of arrow 212, arrow 214, or both. In some cases, an additional clamping system may be present in automated smoothing system 102.

Sensor system 206 identifies a position of smoothing device 202 relative to surface 107 of material 103. The position may be identified using coordinates of a reference coordinate system for manufacturing environment 100.

Sensor system 206 comprises a number of components to identify the position of smoothing device 202 relative to surface 107 of material 103. In this illustrative example, sensor system 206 includes a set of sensors. As used herein, a "set of" items is one or more items. In this illustrative example, a set of sensors is one or more sensors. In this depicted example, a sensor in sensor system 206 may be selected from one of a laser sensor, a camera, a transducer, an ultrasonic sensor, or some other suitable type of position sensor.

As shown in this view, sensor system 206 moves as smoothing device 202 moves. In other illustrative examples, sensor system 206 may not move with smoothing device 202, depending on the particular implementation. Sensor system 206 provides position feedback to a controller (not shown in this view) that controls operation of the components in automated smoothing system 102. Sensor system 206 also may provide feedback to controller 110 shown in FIG. 1. Vacuum table 200, smoothing device 202, or both may be operated by the controller based on the position of smoothing device 202 determined by sensor system 206.

Cutting system 208 may separate sheets of material 103 from roll 106. Cutting system 208 includes a number of components to separate material 103 from roll 106. For example, without limitation, cutting system 208 may include a blade, scissors, a laser cutter, or some other suitable type of cutting mechanism. The components within cutting system 208 move in the direction of arrow 212, arrow 214, or both to cut the material.

Unrolling tool 210 may be used to unroll a desired amount of material onto vacuum table 200. In some illustrative examples, unrolling tool 210 may unroll material 103 onto vacuum table 200 from roll 106. Alternatively, human operator 109 in FIG. 1 may unroll the material.

In an illustrative example, unrolling tool 210 may include components to temporarily attach to one end of material 103. For example, without limitation, unrolling tool 210 may grab the free end of material 103 using a vacuum source and pull material 103 across vacuum table 200 in the direction of arrow 215. Unrolling tool 210 pulls material 103 out onto vacuum table 200 until a desired amount of material 103 is positioned on vacuum table 200. Unrolling tool 210 then may deactivate the vacuum and place the free end of material 103 down on vacuum table 200. In one illustrative example, a puff of air separates material 103 from unrolling tool 210.

Material 103 may be unrolled by rotating roll 106 in the direction of arrow 218 in this illustrative example. In other examples, roll 106 may be absent from automated smoothing system 102. In such a case, material 103 may be precut and positioned on vacuum table 200 by human operator 109, transport device 108, or another component.

In still other illustrative examples, additional rolling devices may be present in automated smoothing system 102. For example, when material 103 includes a backing, the backing may be removed as material 103 is unrolled onto vacuum table 200. This backing may be rolled up on another roll mechanism for easy disposal.

As depicted, vision system 211 is positioned above vacuum table 200. Vision system 211 includes a number of components to identify a level of wrinkle removal for material 103. For example, without limitation, vision system 211 may include a camera or other suitable device to determine the extent to which wrinkles have been removed from material 103. In other words, vision system 211 is used to determine whether a desired smoothness for material 103 has been reached.

In addition, vision system 211 may generate feedback during the smoothing process. This feedback can be used to adjust the movement, pressure, or other parameters of smoothing device 202 as desired.

In some cases, additional vision systems may be positioned relative to vacuum table 200. Further, vision system 211 may have other positions and orientations relative to vacuum table 200 than shown in this view. For instance, vision system 211 may be attached to other structures within automated smoothing system 102 and move accordingly. In still other illustrative examples, vision system 211 may rotate, translate, or otherwise move about a number of axes to establish a desired line of sight.

Figure 3:
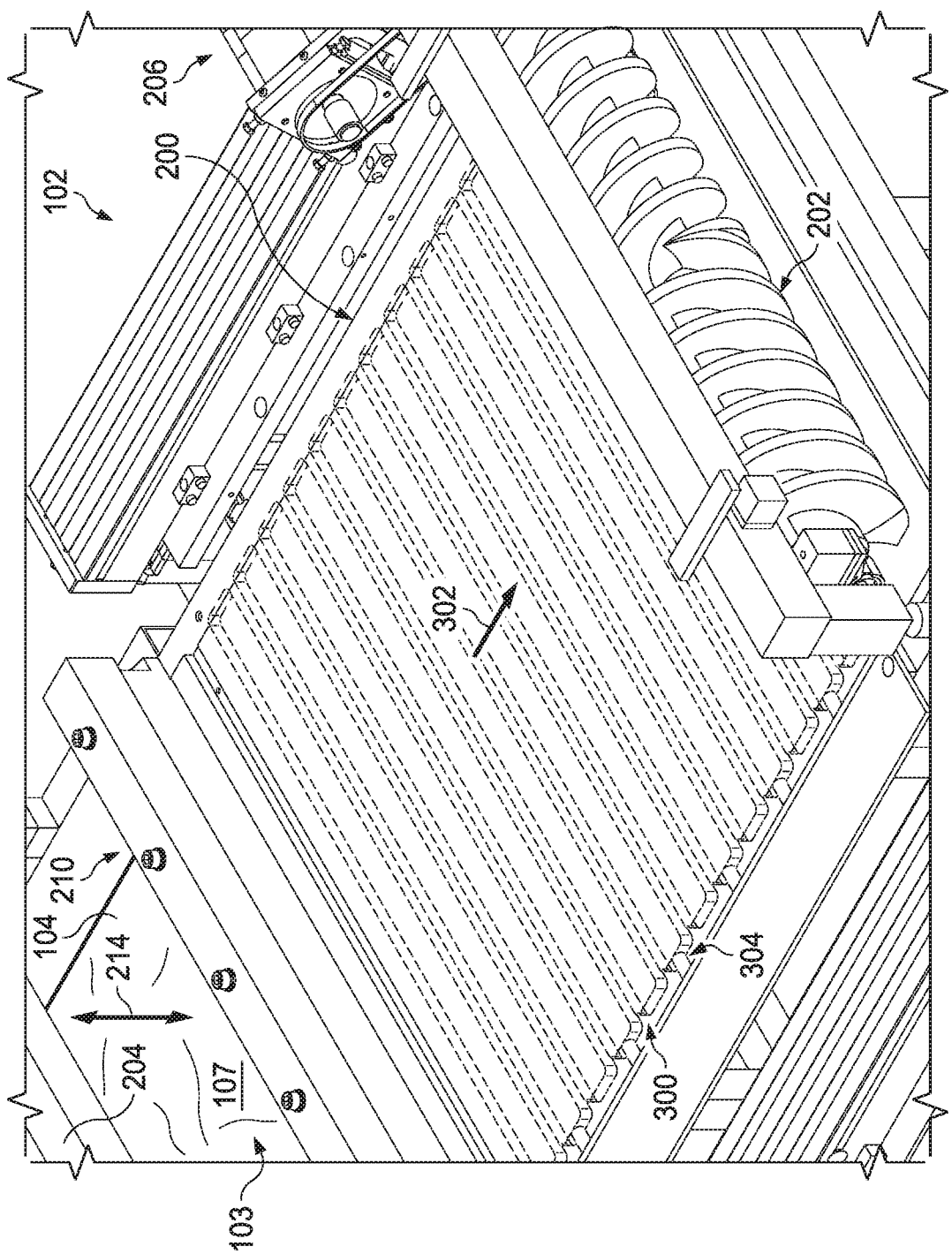
FIG. 3 is an illustration of a vacuum table in accordance with an illustrative embodiment.

In FIG. 3, an illustration of a vacuum table is depicted in accordance with an illustrative embodiment. An enlarged view of vacuum table 200 from FIG. 2 is shown in this figure.

In this depicted example, porous material 213 in vacuum table 200 has been removed to show different components within vacuum table 200. In this illustrative example, vacuum table 200 is divided into group of segments 300. As used here, a "group of" items is two or more items. Thus, group of segments 300 comprises two or more segments.

Group of segments 300 takes the form of hollow compartments through which air can travel. Each segment may be referred to as a vacuum segment in this illustrative example.

Each segment in group of segments 300 is separated from one another. In this manner, a vacuum may be pulled on one segment without affecting other segments in group of segments 300. As a result, different segments in group of segments 300 may be activated at different times, progressively, sequentially, simultaneously, or in some other manner.

In an illustrative example, each sequential segment may be activated in the direction of arrow 302 as smoothing device 202 moves along surface 107 of material 103. Any portion of group of segments 300 may be active at the same time. When a segment is "activated," that segment is under vacuum. Activating each segment in this manner, immediately after smoothing device 202 moves across surface 107 corresponding to that segment, reduces or eliminates wrinkles 104 from material 103.

A controller (not shown in this view) is used to control operation of each segment in group of segments 300 individually. In this illustrative example, the controller may switch on and off a vacuum generator attached to each segment. The vacuum generator may be attached to each segment using vacuum lines (not shown in this view) connected to holes 304 in group of segments 300. One or more of holes 304 correspond to a single segment in group of segments 300. As depicted, holes 304 may be in the sides of group of segments 300. However, in other illustrative examples, holes 304 may be located in any suitable location such that the vacuum lines may be connected to holes 304. For example, holes 304 may be located at the bottom of segments 300.

Figure 4:
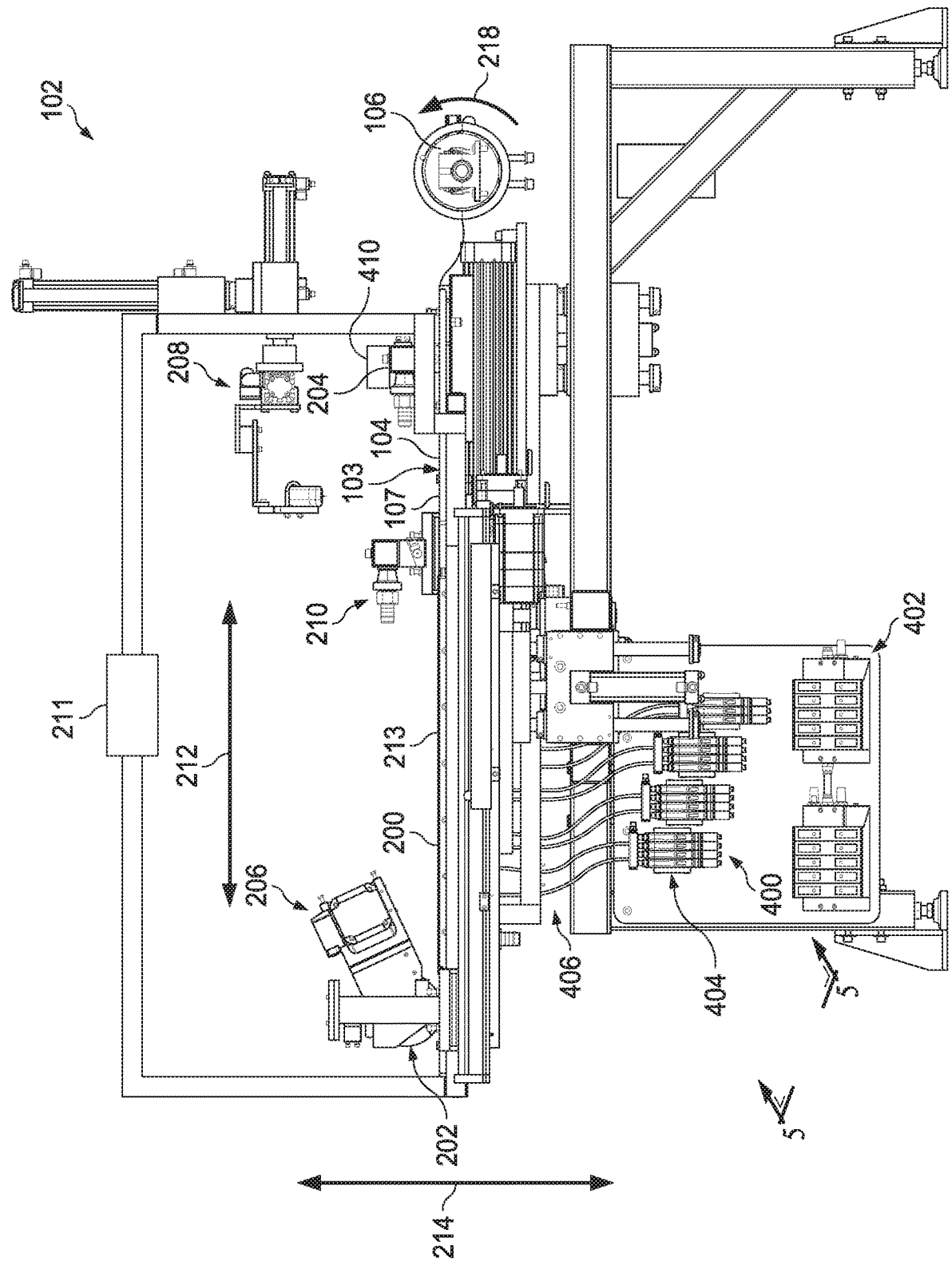
FIG. 4 is an illustration of a side view of an automated smoothing system in accordance with an illustrative embodiment.

With reference now to FIG. 4, an illustration of a side view of an automated smoothing system is depicted in accordance with an illustrative embodiment. In this illustration, a side view of automated smoothing system 102 is shown in the direction of lines 4-4 in FIG. 2.

Vacuum system 400 and controller 402 in automated smoothing system 102 are seen in this view. Vacuum system 400 comprises a number of devices to apply a vacuum to vacuum table 200. In particular, vacuum system 400 progressively applies a vacuum to a portion of group of segments 300 in vacuum table 200 shown in FIG. 3 to pull material 103 against vacuum table 200.

In this illustrative example, "progressively" refers to a process that proceeds in increments. In other words, vacuum system 400 may turn on different segments in group of segments 300 in vacuum table 200 in increments, one right after another.

In an illustrative example, vacuum system 400 may pull a vacuum on a point along material 103 before, during, or after smoothing device 202 moves across that point. However, applying a vacuum to a segment in group of segments 300 in vacuum table 200 shown in FIG. 3 immediately after smoothing device 202 moves over that particular segment may be optimal. In other words, applying a vacuum to a point along material 103 immediately after smoothing device moves across that point of material 103 may be optimal. Progressively pulling material 103 against vacuum table 200 holds the smooth sections of material 103 flat, keeping a desired level of smoothness within the material without forming undesired inconsistencies in the material, tearing the material, and so forth.

Vacuum system 400 may comprise a number of different components. For example, without limitation, vacuum system 400 includes vacuum generators 404 and vacuum lines 406. Vacuum generators 404 provide the vacuum to pull material 103 against vacuum table 200. Vacuum lines 406 connect vacuum generators 404 to different segments in group of segments 300 in vacuum table 200 shown in FIG. 3. Each of vacuum lines 406 may be in fluid communication with one segment in group of segments 300 in this illustrative example.

As illustrated, controller 402 is an electrical device to activate vacuum system 400 to pull a vacuum on vacuum table 200. Specifically, controller 402 activates different segments in vacuum table 200 based on the position of smoothing device 202 relative to surface 107 of material 103.

In this illustrative example, controller 402 may be implemented in software, hardware, firmware, or a combination thereof. When software is used, the operations performed by controller 402 may be implemented using, for example, without limitation, program code configured to run on a processor unit. When firmware is used, the operations performed by controller 402 may be implemented using, for example, without limitation, program code and data and stored in persistent memory to run on a processor unit.

When hardware is employed, the hardware may include one or more circuits that operate to perform the operations in controller 402. Depending on the implementation, the hardware may take the form of a switch, a circuit system, an integrated circuit, an application specific integrated circuit (ASIC), a programmable logic device, or some other suitable type of hardware device configured to perform any number of operations.

A programmable logic device may be configured to perform certain operations. The device may be permanently configured to perform these operations or may be reconfigurable. A programmable logic device may take the form of, for example, without limitation, a programmable logic array, a programmable array logic, a field programmable logic array, a field programmable gate array, or some other type of programmable hardware device.

In some illustrative examples, the operations, processes, or both performed by controller 402 may be performed using organic components integrated with inorganic components. In some cases, the operations, processes, or both may be performed entirely of organic components, excluding a human being. As one illustrative example, circuits in organic semiconductors may be used to perform these operations, processes, or both. The aforementioned examples also may be applied to controller 110, as shown in FIG. 1.

Controller 402, controller 110, or both, may be implemented in a computer system. The computer system may comprise one or more computers. When more than one computer is present in the computer system, those computers may be in communication with one another over a communications medium such as a network. In this illustrative example, controller 402 and controller 110 may communicate with one another. In other examples, at least one of controller 402 or controller 110 may be implemented as a chip or device other than a computer.

Automated smoothing system 102 is also equipped with blower 410. Blower 410 is configured to blow ionized air (not shown in this view) on material 103.

Blower 410 is located on clamping system 204 in this example. In other illustrative examples, blower 410 may be located on unrolling tool 210 or smoothing device 202. Additional blowers also may be used to direct ionized air onto surface 107 of material 103.

In this illustrative example, ionized air may be used to reduce static electricity on and around material 103. It may be desirable to reduce static electricity such that material 103 does not stick to vacuum table 200 in an undesired manner. For instance, ionized air may be used to prevent the material from sticking to vacuum table 200 when the vacuum is turned off and the material is ready for transport by transport device 108.

Figure 5:
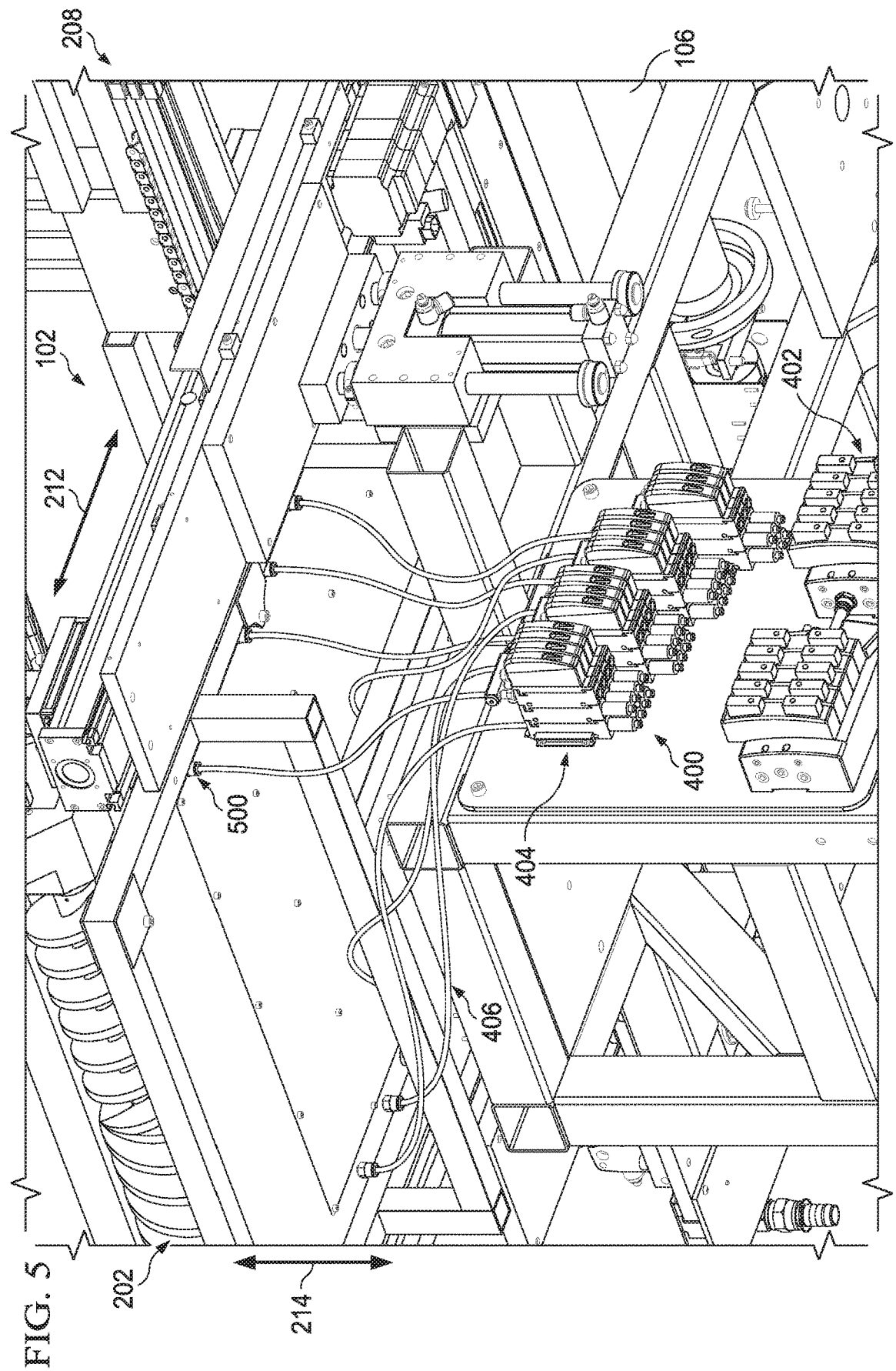
FIG. 5 is an illustration of a bottom view of a vacuum table in accordance with an illustrative embodiment.

Turning next to FIG. 5, an illustration of a bottom view of a vacuum table is depicted in accordance with an illustrative embodiment. In this depicted example, a bottom view of vacuum table 200 is shown in the direction of lines 5-5 in FIG. 4.

As shown, vacuum lines 406 are connected to ports 500 extending from vacuum table 200. Each of vacuum lines 406 is connected to one of ports 500 in this illustrative example. A segment in group of segments 300 in FIG. 3 may include one or more of ports 500.

Figure 6:
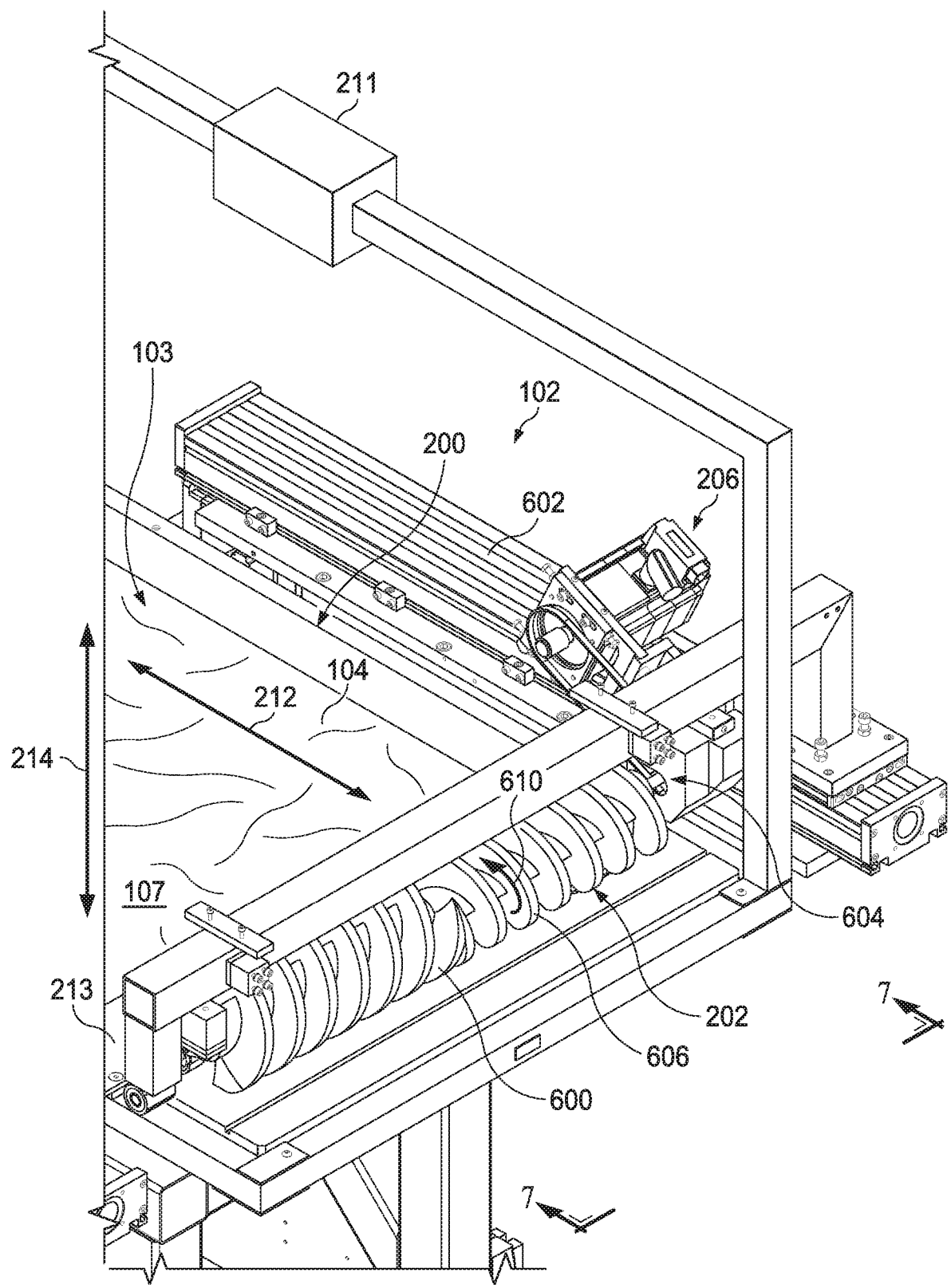
FIG. 6 is an illustration of a smoothing device including a brush in accordance with an illustrative embodiment.

Referring to FIG. 6, an illustration of a smoothing device including a brush is depicted in accordance with an illustrative embodiment. In this figure, an enlarged view of smoothing device 202 from FIG. 2 is shown.

As depicted, smoothing device 202 includes brush 600, first movement system 602, and second movement system 604. In this illustrative example, brush 600 moves across surface 107 of material 103 shown in FIG. 1 using at least one of first movement system 602 and second movement system 604.

In this depicted example, brush 600 is an object configured to remove wrinkles 104 from material 103. Brush 600 has bristles 606. Bristles 606 may be helically wound bristles in this illustrative example. In other words, bristles 606 are twisted about brush 600 in a repeating spiral pattern. This configuration of brush 600 with helically wound bristles 606 forms a cylindrical brush.

In other illustrative examples, different shapes and configurations for brush 600 may be used. For example, brush 600 may comprise straight bristles that hang from an elongate member and brush over surface 107 of material 103. In another illustrative example, the entire surface of brush 600 may be covered in bristles 606, instead of having a helically wound portion of bristles 606.

The size and spacing between helically wound bristles 606 can be modified to smooth material 103 in a desired manner. For instance, the helix may be wound tightly such that each winding of bristles 606 is positioned next to one another. In another example, the helix may be wound such that each winding has a desired amount of space in between. In this manner, the pitch of bristles 606 is modified to reduce wrinkles 104 as desired. The pitch of bristles 606 is the width of one complete helix turn, measured parallel to the axis of brush 600.

Additionally, the stiffness, material, or length selected for bristles 606 may be modified based on the type of material being smoothed. In some cases, softer bristles 606 may be needed. As an example, when smoothing fragile material, softer bristles 606 may be used. Conversely, when more rigid and less fragile material is being smoothed, different bristles 606 may be used. In this manner, brush 600, with bristles 606, is replaceable and can be exchanged with another brush and bristle configuration, depending on the particular implementation. Brush 600 also may be exchanged with an air knife or other smoothing device in other implementations.

In an illustrative example, first movement system 602 includes components configured to translate smoothing device 202 across surface 107 of material 103. First movement system 602 may include at least one of a track system, wheels, a pneumatic device, a hydraulic device, a motor, casters, or other suitable components.

In this illustrative example, first movement system 602 is a track system connected to vacuum table 200. First movement system 602 is configured to move smoothing device 202 back and forth over material 103 in the direction of arrow 212.

As illustrated, second movement system 604 comprises components configured to rotate brush 600 having helically wound bristles 606 as smoothing device 202 translates across surface 107 of material 103. Second movement system 604 may include a motor and other suitable components configured to rotate brush 600. In this illustrative example, second movement system 604 rotates brush 600 over material 103 in the direction of arrow 610. This rotational movement, combined with the translation of smoothing device 202 pushes wrinkles 104 out of material 103. With the bristles 606 helically wound as depicted, wrinkles will move wrinkles 104 from the inside to the outside. Specifically, the combination of helically wound bristles 606, the rotational movement in the direction of arrow 610 and the translational movement in the direction of arrow 212, may smooth material 103 by pushing wrinkles 104 from about the center of material 103 outwards to the edges of material 103. Other patterns of bristles 606 or other movements may move wrinkles 104 in different directions.

In this illustrative example, a third movement system (not shown in this view) also may be used to position brush 600 relative to surface 107 of material 103. As an example, the third movement system moves brush 600 toward surface 107 and away from surface 107 in the direction of arrow 214. Through the use of first movement system 602, second movement system 604, and optionally a third movement system, precise positioning and operation of smoothing device 202 is achieved.

Figure 7:
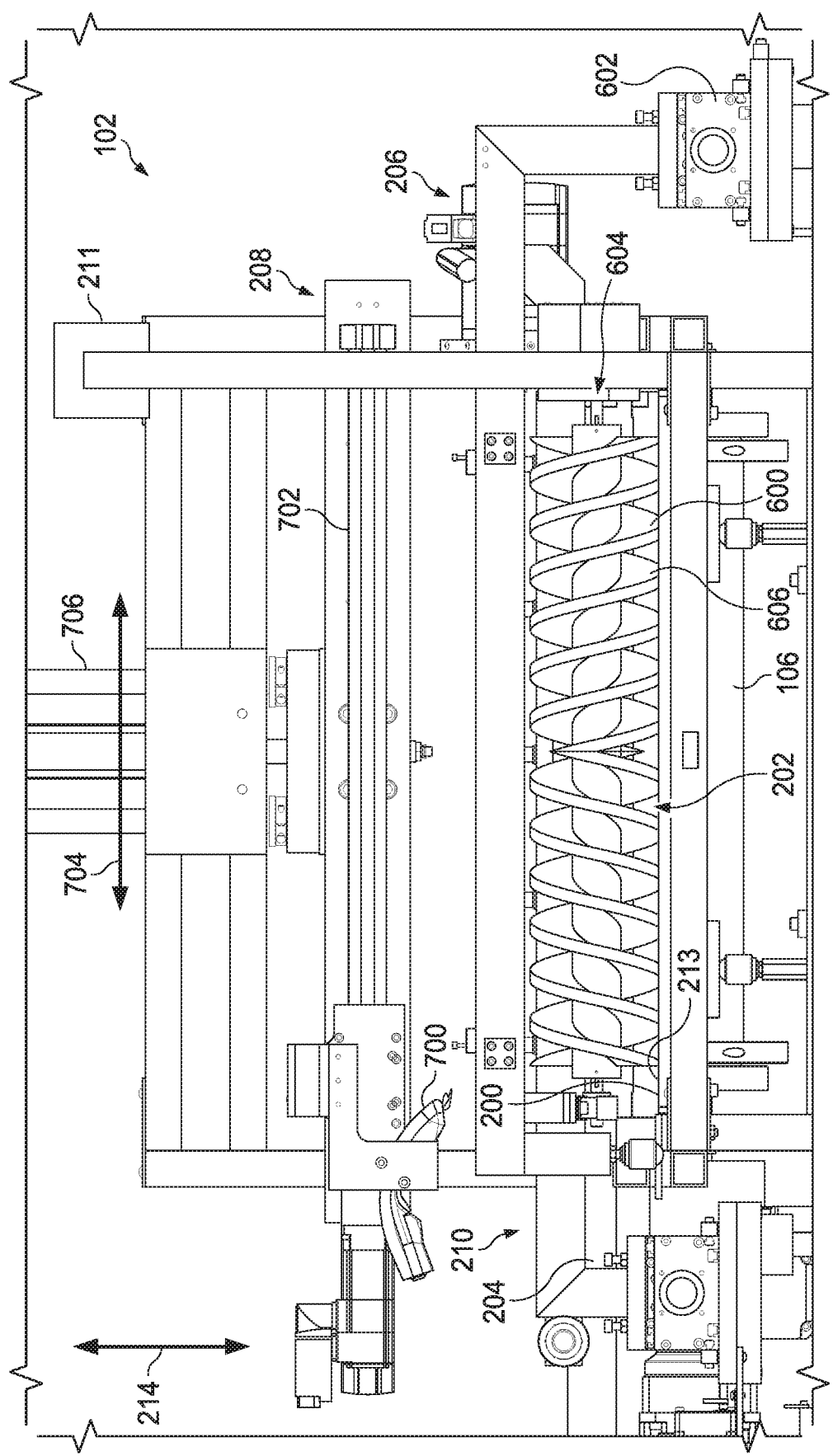
FIG. 7 is an illustration of a front view of a brush system and a cutting system in accordance with an illustrative embodiment.

In FIG. 7, an illustration of a front view of a brush system and a cutting system is depicted in accordance with an illustrative embodiment. In this view, smoothing device 202 is shown in the direction of lines 7-7 in FIG. 6. In this view, the helically wound configuration of bristles 606 is seen in more detail.

In addition, cutting system 208 with cutter 700 and track system 702 is shown. Cutter 700 is an object configured to cut through material 103 shown in FIG. 1. Cutter 700 may take the form of a blade, a knife, scissors, a laser cutter, or some other suitable object. Track system 702 moves cutter 700 back and forth in the direction of arrow 704 to cut material 103.

In this illustrative example, cutting system 208 is attached to movement system 706. Movement system 706 comprises at least one of a motor, a track system, a pulley, or some other suitable device configured to move cutting system 208 up and down in the direction of arrow 214. In this manner, cutting system 208 can be accurately positioned relative to the surface of a material to cut through material 103.

FIGS. 8-16 illustrate a process for smoothing material 103 in accordance with an illustrative embodiment. In FIGS. 8-16, material 103 is smoothed and cut using automated smoothing system 102.

Figure 8:
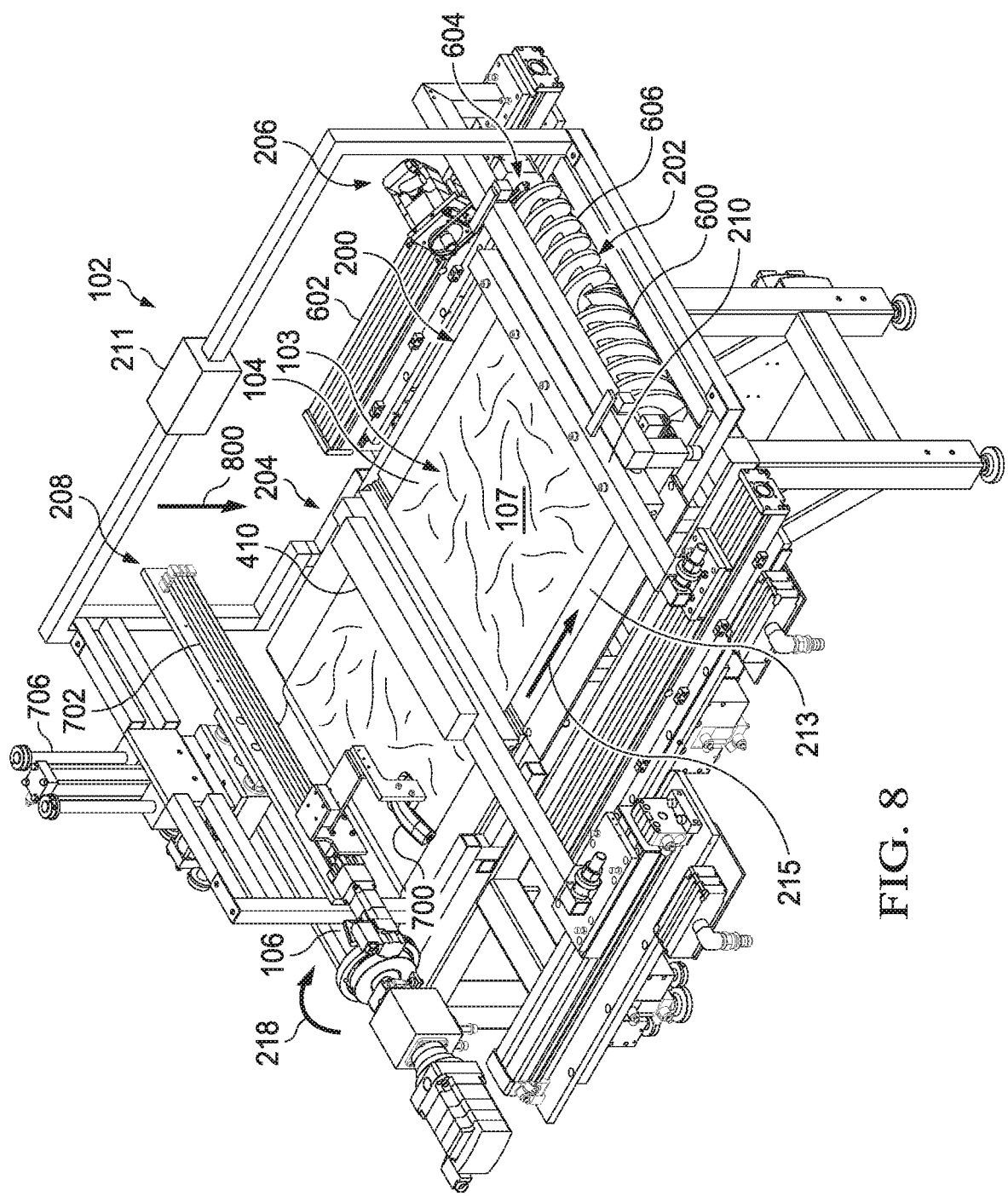
FIGS. 8-16 are illustrations of a process for smoothing a material in accordance with an illustrative embodiment.

With reference to FIG. 8, unrolling tool 210 has unrolled material 103 on roll 106 onto vacuum table 200. Unrolling tool 210 picked up the free end of material 103 and moved in the direction of arrow 215 to unroll material 103. Material 103 rolled out onto vacuum table 200 has wrinkles 104 throughout. After the material is rolled out onto vacuum table 200, clamping system 204 moves downward in the direction of arrow 800 to clamp down material 103.

Figure 9:
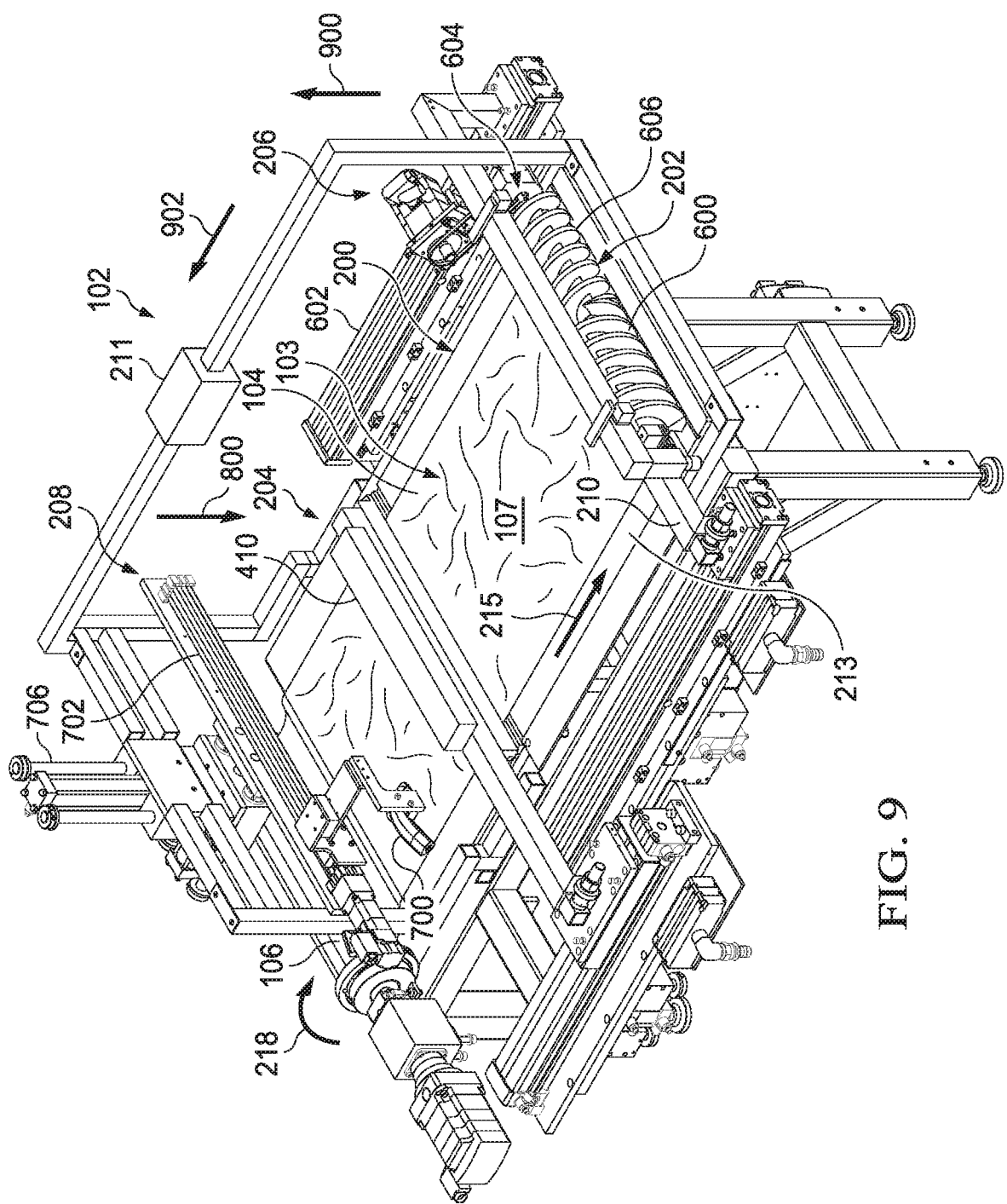

In FIG. 9, unrolling tool 210 has released material 103 and continued to move in the direction of arrow 215 shown in FIG. 2 to a retracted position. Once unrolling tool 210 is retracted, smoothing device 202 moves upward in the direction of arrow 900, over unrolling tool 210, and toward clamping system 204 in the direction of arrow 902 to a starting position.

Smoothing device 202 moves over material 103 to the starting position without touching surface 107 in this illustrative example. In other words, smoothing device 202 is lifted and then retracted. After reaching the starting position, smoothing device 202 moves downward in the direction of arrow 800 to touch surface 107 of material 103.

Figure 10:
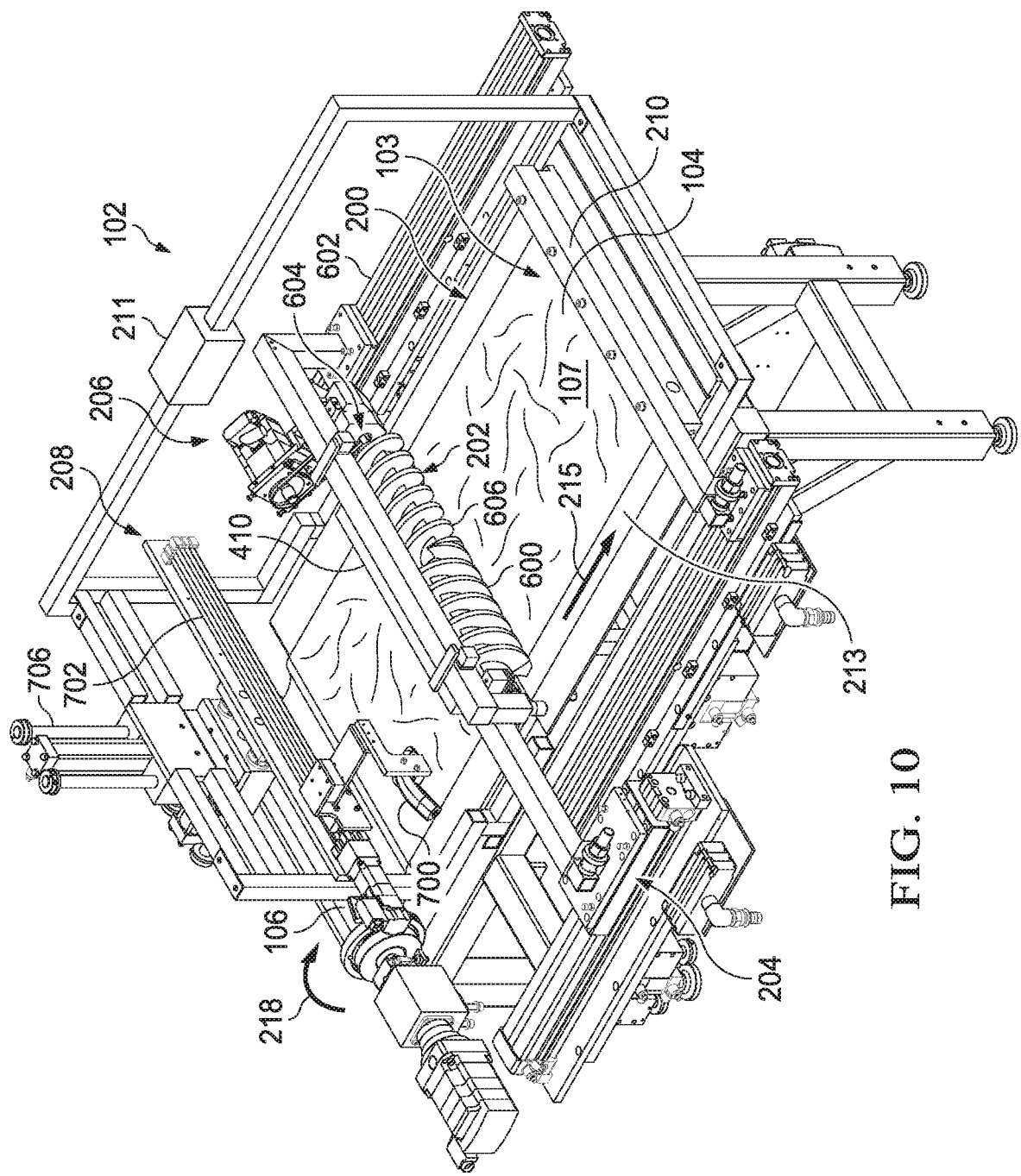

FIG. 10 shows smoothing device 202 in the starting position. In the starting position, bristles 606 touch surface 107 of material 103. Smoothing device 202 may now move in the direction of arrow 215 to smooth material 103. As smoothing device 202 moves, bristles 606 are rotated to push out wrinkles 104 from the material.

In this illustrative example, sensor system 206 provides continuous position feedback to controller 402 shown in FIG. 4. This position feedback is used to activate different segments in group of segments 300 in vacuum table 200 shown in FIG. 3. For instance, a vacuum is applied to a first segment of vacuum table 200 nearest clamping system 204 immediately after smoothing device 202 passes over that segment. A vacuum may then be applied to a second segment of vacuum table 200 adjacent to the first segment, and so on, to progressively pull a substantially smooth section of material 103 against vacuum table 200 after smoothing device 202 has removed wrinkles 104 from that section. Specifically, a vacuum may be pulled through porous material 213 to progressively pull the substantially smooth section of material 103 against porous material 213 of vacuum table 200.

Figure 11:
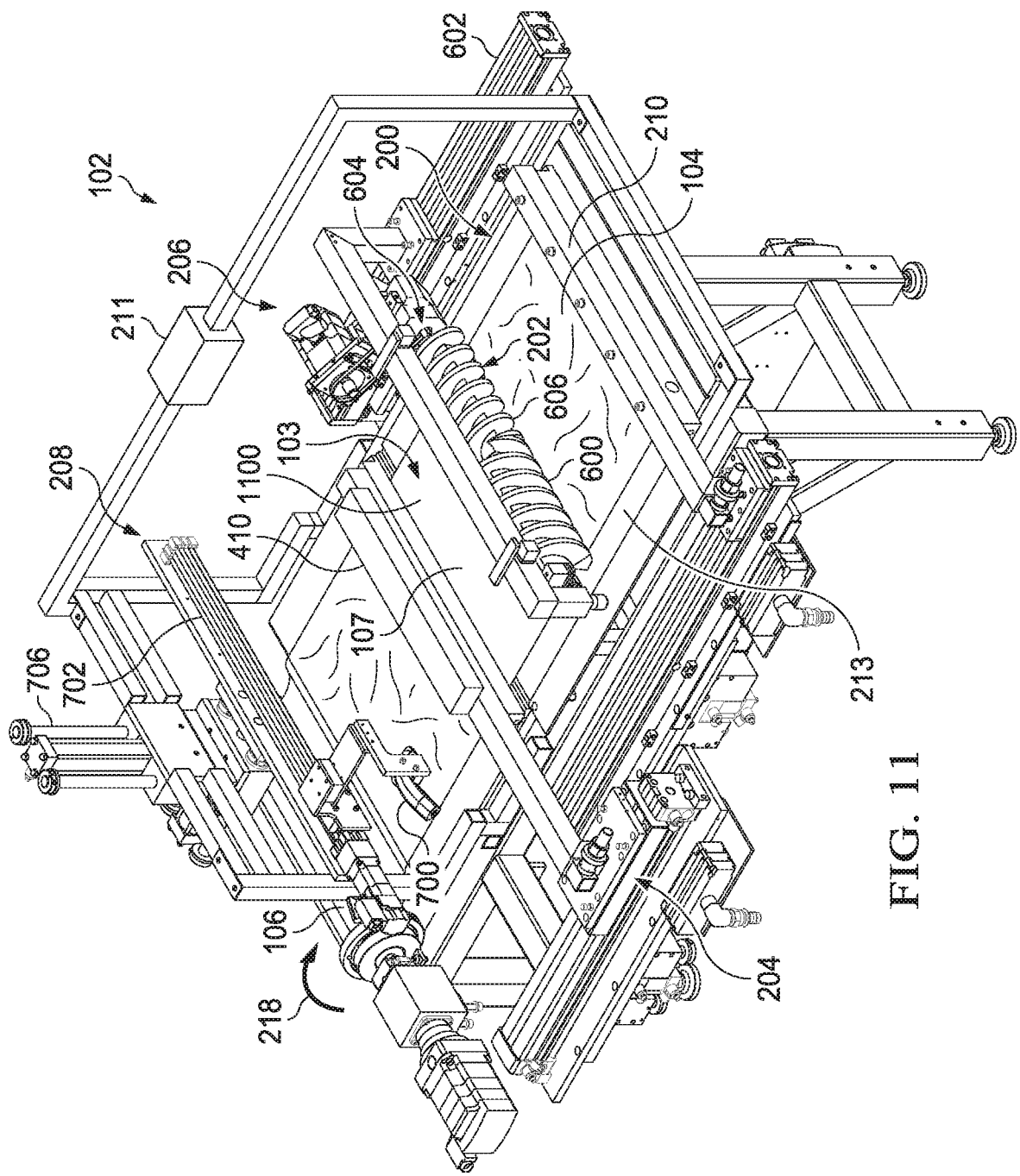

Referring to FIG. 11, smoothing device 202 has moved approximately halfway across surface 107 of material 103 as different segments in vacuum table 200 are activated. Substantially smooth section 1100 of material 103 has been formed. In other words, automated smoothing system 102 has reduced or eliminated wrinkles 104 from material 103 to within selected tolerances within substantially smooth section 1100. Vision system 211 may monitor the progress of smoothing device 202 in removing wrinkles 104.

Figure 12:
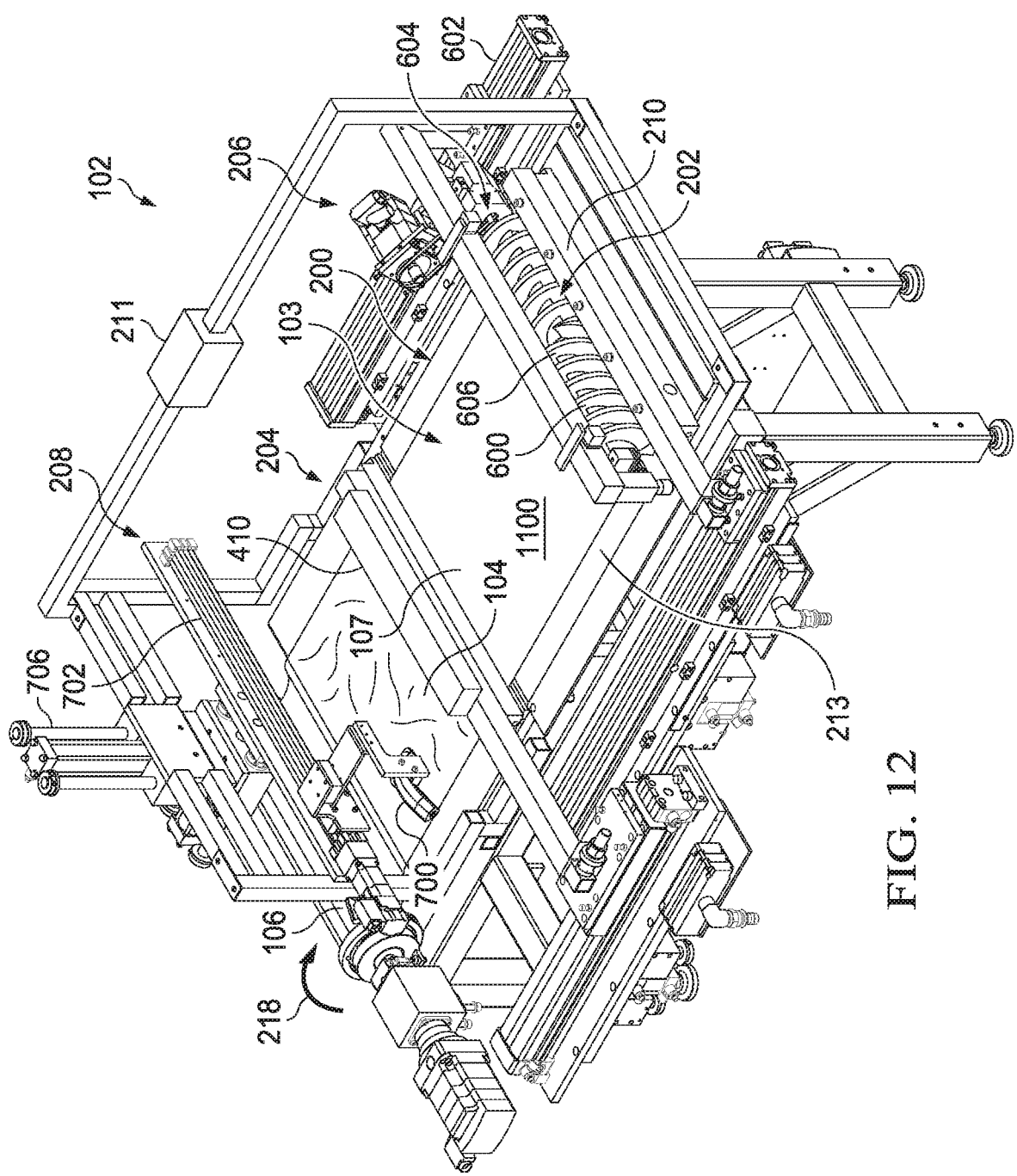

FIG. 12 shows smoothing device 202 after reaching the end point. A puff of air (not shown) may be used to prevent folds from occurring at the edge of material 103 as smoothing device 202 reaches the edge.

In some cases, an inspection of substantially smooth section 1100 of material 103 may be completed to determine whether wrinkles 104 have been removed in a desired manner. For instance, surface 107 may be inspected using vision system 211 to determine whether it is smoothed within selected tolerances. The process shown in FIGS. 8-12 may be repeated if additional smoothing of that sheet of material 103 is required. Otherwise, substantially smooth section 1100 of material 103 is cut into a sheet.

Figure 13:
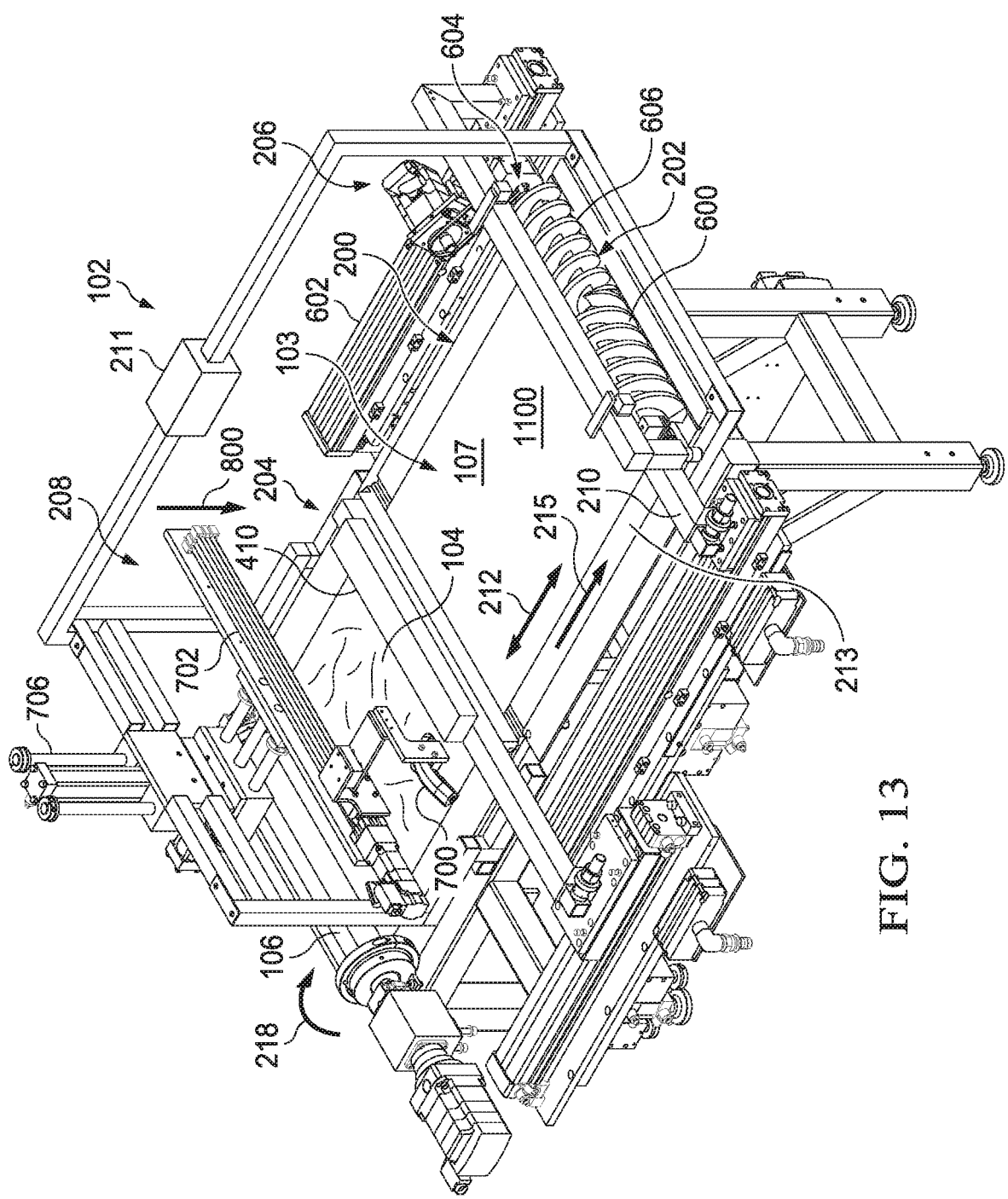

Referring next to FIG. 13, smoothing system 202 has moved to the other side of unrolling tool 210. The vacuum is still applied to group of segments 300 to hold the smooth material against porous material 213 of vacuum table 200.

Cutting system 208 is positioned relative to material 103 at a desired location for a cut. For example, cutter 700 is moved to the location for the cut. Specifically, cutting system 208 has moved outward in the direction of arrow 215 from its stored position. Cutting system 208 moves downward in the direction of arrow 800 to place cutter 700 on surface 107 of substantially smooth section 1100 of material 103.

Figure 14:
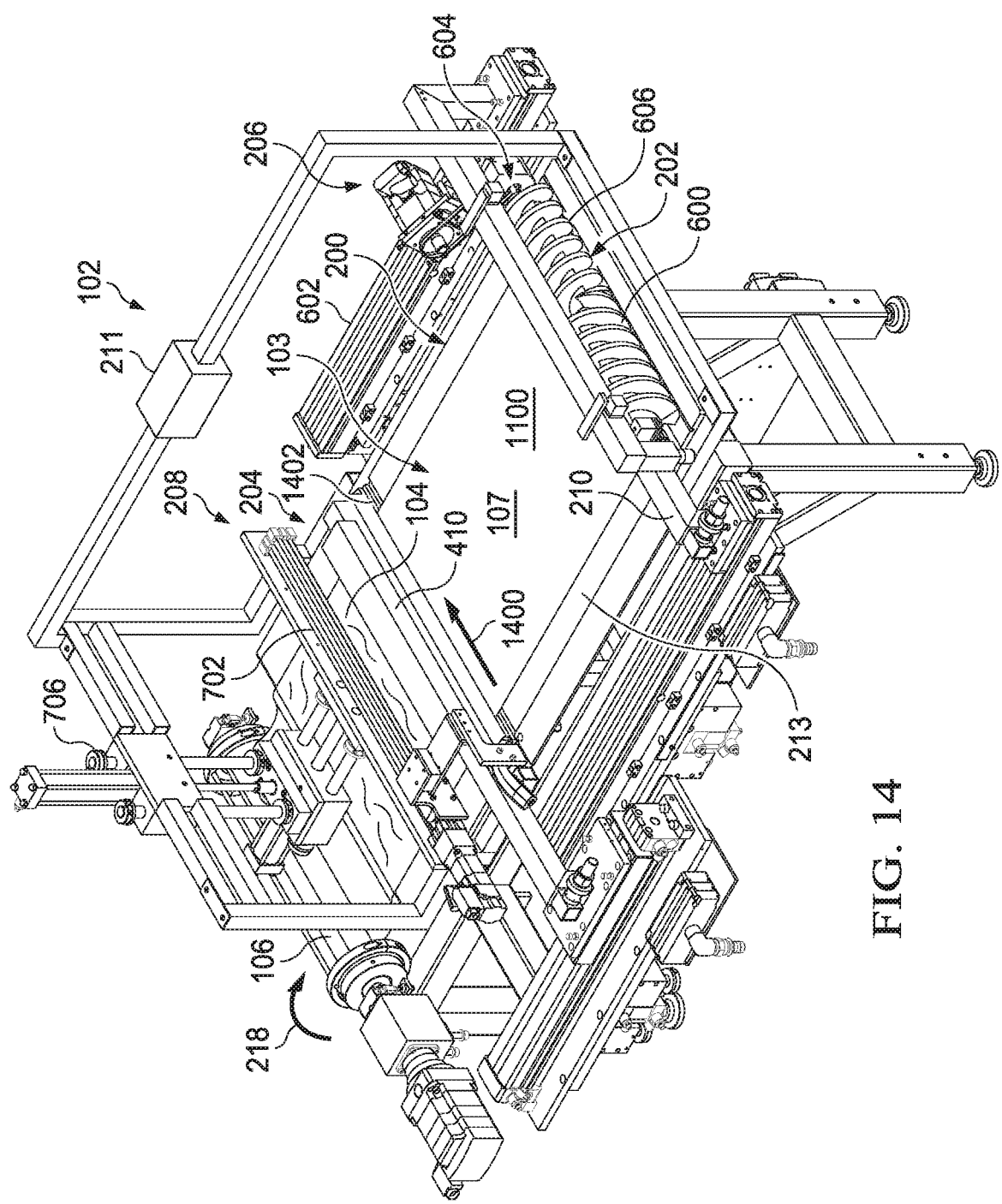

In FIG. 14, cutting system 208 has moved downward in the direction of arrow 800 using movement system 706. Cutter 700 touches surface 107 of material 103. Cutter 700 now begins to move in direction 1400 using track system 702 to cut through material 103. Cutter 700 cuts material 103 to form a substantially smooth sheet of material from material 103. As depicted, the substantially smooth sheet comprises substantially smooth section 1100. Cutter 700 cuts substantially smooth section 1100 of material 103 away from roll 106. In this manner, the smoothed sheet of material 103 is completely separated from roll 106 in this illustrative example.

In this illustrative example, cutter 700 moves within groove 1402 in vacuum table 200 to cut material 103. Groove 1402 may serve as a guide for accurate cutting.

Figure 15:
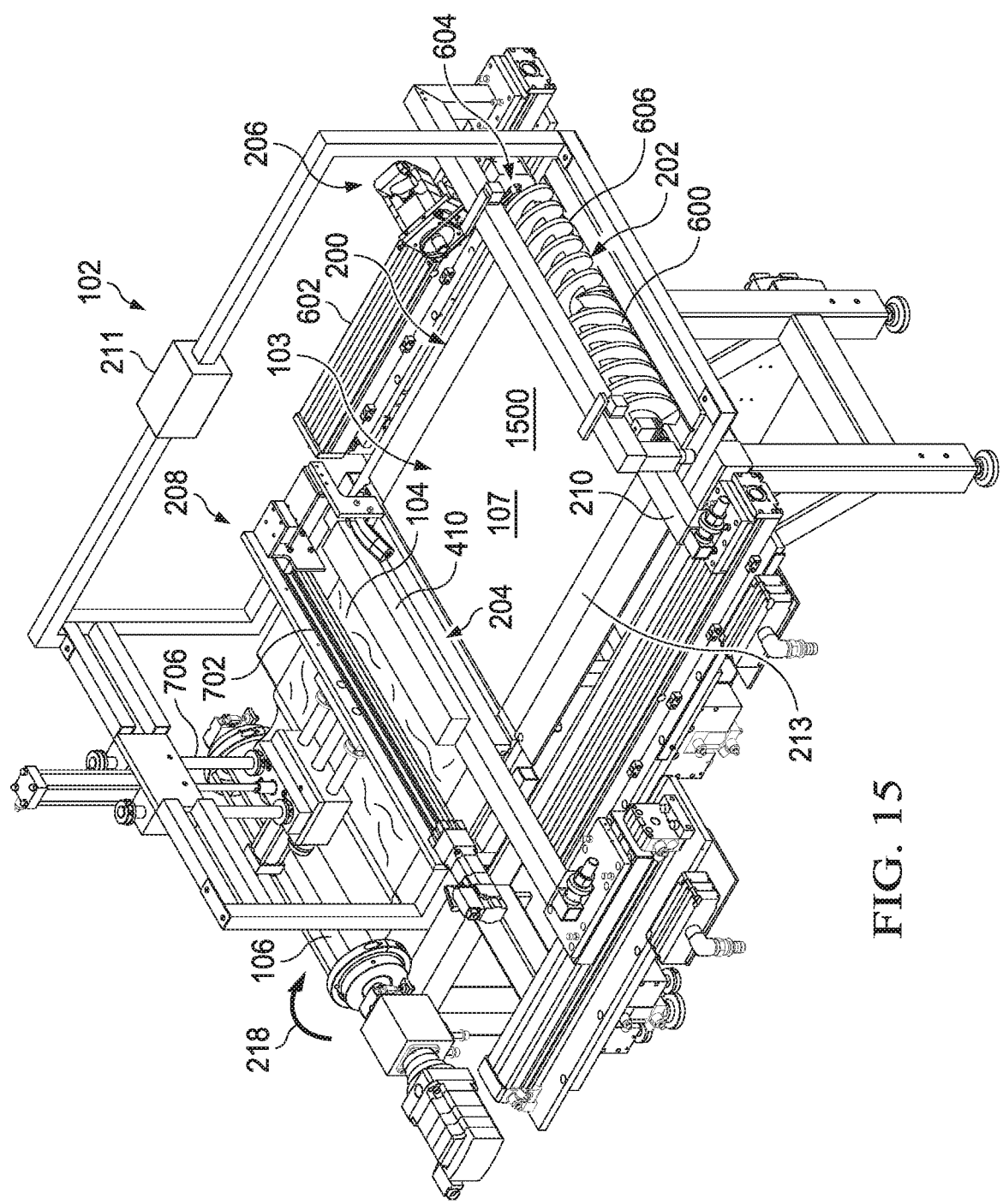

With reference to FIG. 15, substantially smooth sheet 1500 of material 103 has been formed. The smoothing and cutting process now may be complete. Substantially smooth sheet 1500 of material 103 is ready to be moved to a different location for further processing.

Figure 16:
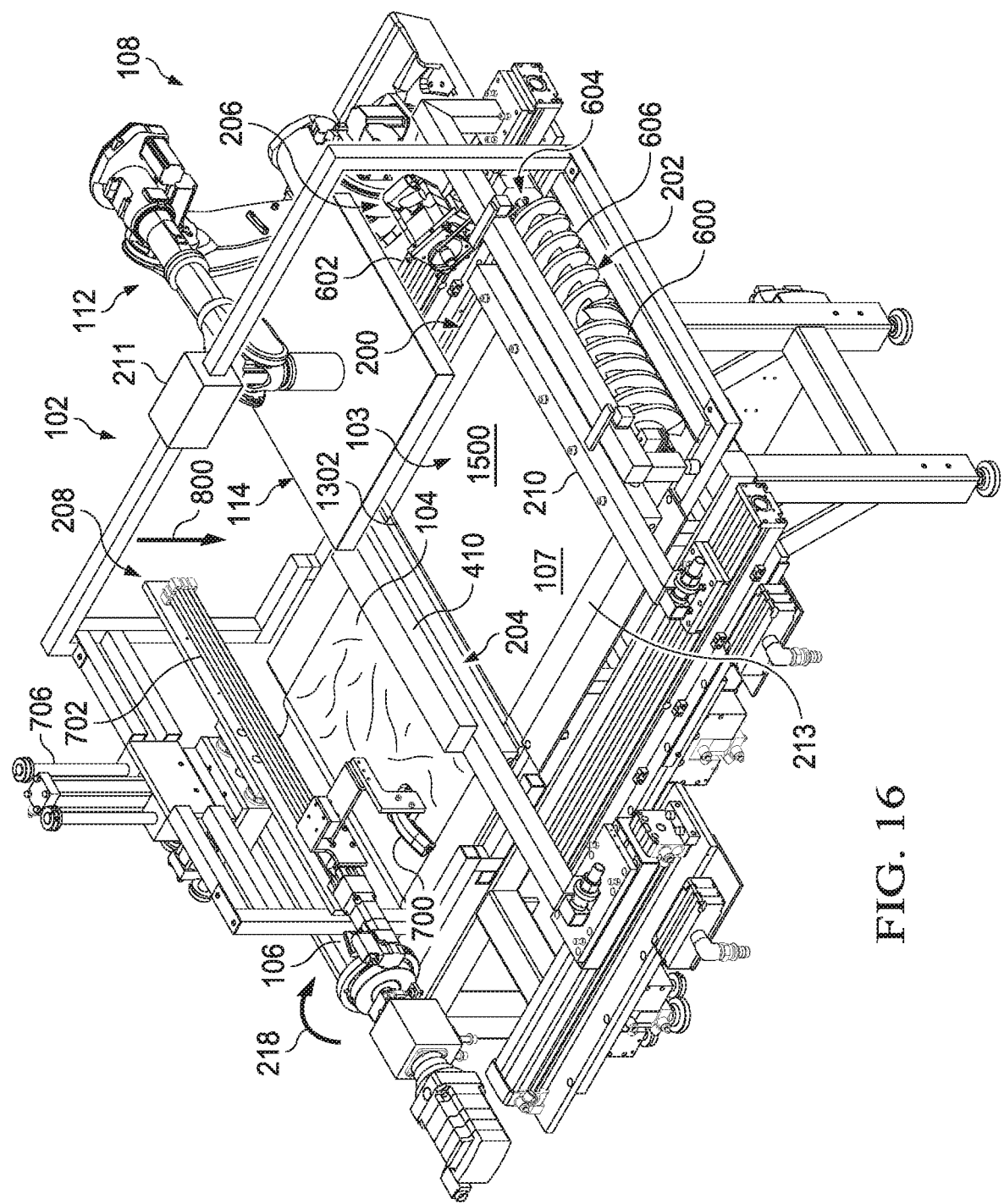

Turning now to FIG. 16, transport device 108 with end effector 114 is positioned over substantially smooth sheet 1500 of material 103. End effector 114 may move downward in the direction of arrow 800 to apply a force to surface 107 of substantially smooth sheet 1500 of material 103.

Transport device 108 then pulls a vacuum on surface 107 to transfer substantially smooth sheet 1500 of material 103 to end effector 114 for transport. Vacuum table 200 is deactivated. A puff of air from underneath substantially smooth sheet 1500 of material 103 (not shown) may aid in transferring substantially smooth sheet 1500 of material 103 to end effector 114.

Although the illustrations in FIGS. 8-16 show material 103 being unrolled from roll 106, precut sheets of wrinkled material 103 may be used instead. In such a case, the sheet is positioned on vacuum table 200, clamped down using clamping system 204, and processed as described with reference to FIGS. 9-16. In this manner, automated smoothing system 102 provides versatility in its use with various types, shapes, or thicknesses of material.

Figure 17:
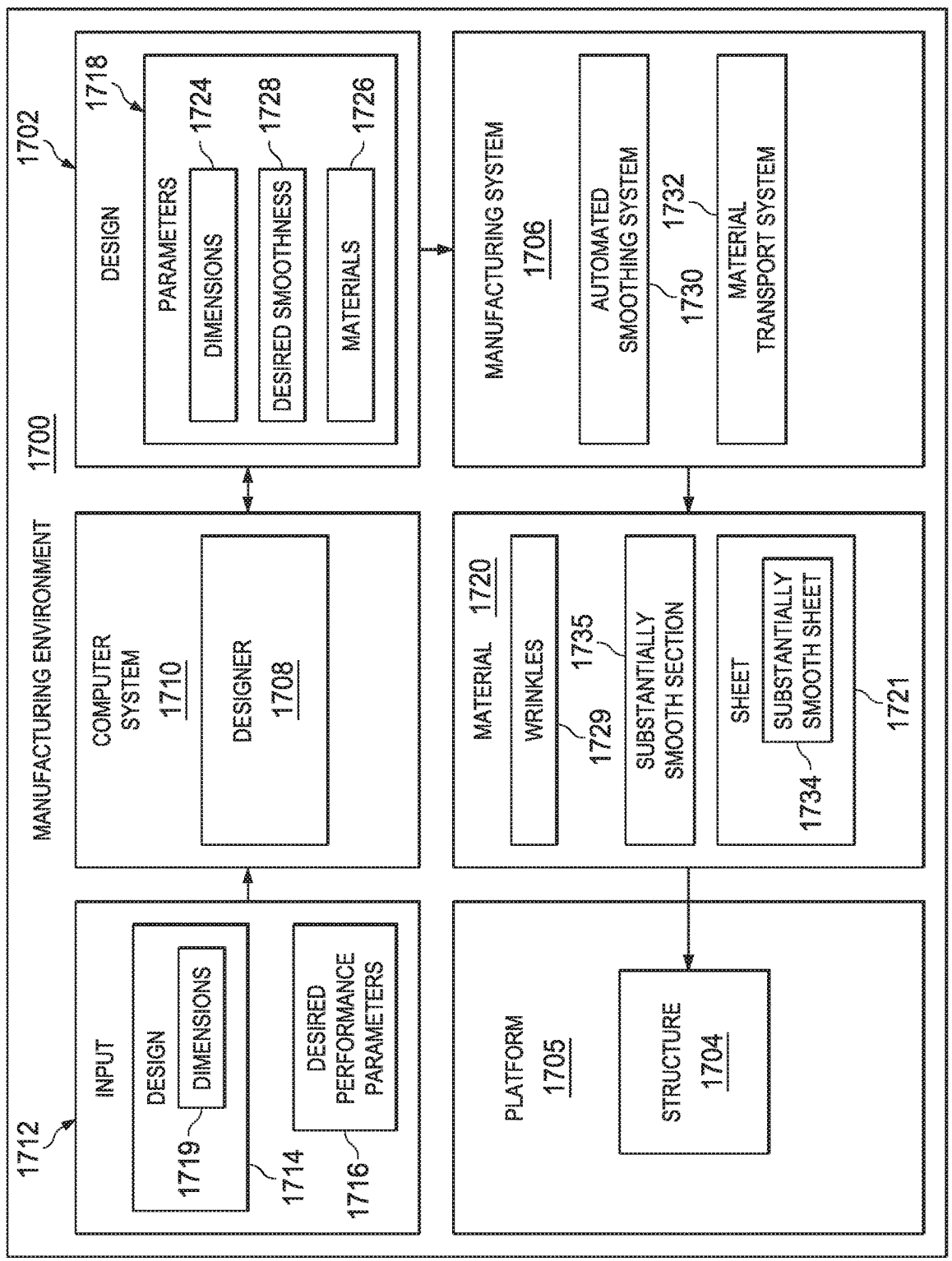
FIG. 17 is an illustration of a block diagram of a manufacturing environment in accordance with an illustrative embodiment.

In FIG. 17, an illustration of a block diagram of a manufacturing environment is depicted in accordance with an illustrative embodiment. In this illustrative example, manufacturing environment 1700 is depicted in block form to illustrate different components for one or more illustrative embodiments that may be used to manufacture structures using sheets of material.

In this illustrative example, design 1702 may be generated for structure 1704. Structure 1704 may be selected from one of, for example, a composite part, a repair patch, a metal part, a panel, a compartment, a control surface, a structural member, a housing, or some other suitable part.

Structure 1704 may be used in platform 1705. Platform 1705 may be, for example, without limitation, a mobile platform, a stationary platform, a land-based structure, an aquatic-based structure, and a space-based structure. More specifically, the platform may be a surface ship, a tank, a personnel carrier, a train, an aircraft, a spacecraft, a space station, a satellite, a submarine, an automobile, a power plant, a bridge, a dam, a house, a manufacturing facility, a building, and other suitable platforms.

Design 1702 may be, for example, a computer-aided design model or some other model that may be used to control manufacturing system 1706 to fabricate structure 1704. In this illustrative example, design 1702 may be generated using designer 1708.

Designer 1708 may be implemented in software, hardware, firmware or a combination of thereof. When software is used, the operations performed by designer 1708 may be implemented in program code configured to run on a processor unit. When firmware is used, the operations performed by designer 1708 may be implemented in program code and data and stored in persistent memory to run on a processor unit. When hardware is employed, the hardware may include circuits that operate to perform the operations in designer 1708.

As depicted, designer 1708 may be implemented in computer system 1710. Computer system 1710 may be one or more computers. When more than one computer is present in computer system 1710, those computers may communicate with each other using a communications medium such as a network.

In the illustrative example, design 1702 for structure 1704 is generated using input 1712. Input 1712 may include, for example, design 1714, desired performance parameters 1716, and other suitable types of input. Input 1712 may originate from various sources. For example, input 1712 may be received from at least one of a file, a human operator, a computer-aided design, a specification, or some other suitable source.

In the illustrative example, design 1714 may be a computer-aided design model of structure 1704. In the depicted example, design 1714 may include dimensions 1719 for structure 1704. Dimensions 1719 may include, for example, at least one of cross-sectional shapes, diameter, length, or other suitable parameters that may be used to describe structure 1704.

Desired performance parameters 1716 are for the performance of structure 1704. In this illustrative example, desired performance parameters 1716 may be selected from at least one of a load, a coefficient of thermal expansion, toughness, fracture resistance, stiffness, strength, visibility, detectability, electromagnetic effect protection properties, or other suitable performance parameters that may be desirable for structure 1704.

With input 1712, designer 1708 generates design 1702. For example, designer 1708 may generate parameters 1718 for material 1720 used to form structure 1704.

As depicted, parameters 1718 may be selected for each sheet 1721 of material 1720 used to form structure 1704. For example, parameters 1718 may include at least one of dimensions 1724, materials 1726, desired smoothness 1728, or other suitable parameters. Material 1720 has wrinkles 1729 in this example.

Parameters 1718 may include dimensions 1724 of each sheet 1721 of material 1720 used to form structure 1704. Dimensions 1724 may include a thickness of each sheet 1721 of material 1720. For instance, parameters 1718 may indicate that material 1720 is a thin film material.

In the illustrative examples, materials 1726 may describe component materials within material 1720. For example, materials 1726 may be selected from at least one of a metal, a metal alloy, carbon fiber, a ceramic, a polymer, or some other suitable material.

In an illustrative example, desired smoothness 1728 describes the condition of sheet 1721 of material 1720 needed to manufacture structure 1704. Desired smoothness 1728 may refer to an amount of wrinkles 1729, or folds, allowed to be present in sheet 1721 of material 1720. Desired smoothness 1728 also may indicate other characteristics for the surface of sheet 1721 of material 1720. From parameters 1718, instructions for manufacturing system 1706 are generated.

In the illustrative example, manufacturing system 1706 may use design 1702 to manufacture structure 1704. Additionally, manufacturing system 1706 also removes wrinkles 1729 material 1720. After the wrinkles 1729 are removed, and material 1720 has been cut to form sheet 1721 with desired dimensions 1724, sheet 1721 of material 1720 is used to form structure 1704.

Manufacturing system 1706 may include a number of different types of components. For example, manufacturing system 1706 may include automated smoothing system 1730 and material transport system 1732. In this illustrative example, automated smoothing system 1730 and material transport system 1732 include various devices. These devices may be computer-controlled. In some cases, these devices may be operated or observed by a human operator. Manufacturing environment 100 in FIG. 1 may be a physical implementation of manufacturing system 1706 of FIG. 17.

As depicted, automated smoothing system 1730 includes various components used to form substantially smooth sheet 1734 of material 1720. Automated smoothing system 102 shown in FIGS. 1-16 is an example of a physical implementation for automated smoothing system 1730 shown in block form in this figure.

Automated smoothing system 1730 utilizes a segmented vacuum table and smoothing device to progressively remove wrinkles 1729 from material 1720. Material 1720 is clamped down while automated smoothing system 1730 removes wrinkles 1729. As the smoothing device moves over material 1720, wrinkles 1729 are removed to form substantially smooth section 1735 of material 1720. This section gets larger as the smoothing device progresses over material 1720. Segments in the vacuum table are activated to pull substantially smooth section 1735 of material 1720 against the vacuum table to keep it flat. Specifically, a vacuum may be pulled through a porous material over the segments in the vacuum table to pull substantially smooth section 1735 of material 1720 against the porous material of the vacuum table. More and more segments are activated as more of material 1720 is smoothed. These segments remain activated until a desired amount of material 1720 is smoothed.

As illustrated, material transport system 1732 may be a system used to transport sheet 1721 of material 1720 after being smoothed. In other words, after forming substantially smooth sheet 1734 of material 1720, material transport system 1732 may transport substantially smooth sheet 1734. Transport device 108 shown in FIG. 1 is an example of a physical implementation for material transport system 1732 shown in block form in this figure.

In this illustrative example, material transport system 1732 may be a robotic device, a conveyor system, a human operator, an elevator, a magnetic system, or other suitable device. In some cases, manufacturing system 1706 may include additional tools to cut sheet 1721 of material 1720, trim structure 1704, bond components, cure components, or perform other processes.

The illustration of manufacturing environment 1700 in FIG. 17 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, substantially smooth sheet 1734 of material 1720 can be used for other purposes other than forming structure 1704. As an example, substantially smooth sheet 1734 of material 1720 can be placed over a surface to seal the surface. In other illustrative examples, substantially smooth sheet 1734 of material 1720 may provide a corrosive-resistant coating for a structure. In yet another illustrative example, substantially smooth sheet 1734 of material 1720 may be used to form dielectric layers for electronic devices. In still another illustrative example, substantially smooth sheet 1734 of material 1720 may be used to rework a damaged structure.

The different components shown in FIGS. 1-16 may be combined with components in FIG. 17, used with components in FIG. 17, or a combination of the two. Additionally, some of the components in FIGS. 1-16 may be illustrative examples of how components shown in block form in FIG. 17 can be implemented as physical structures.

Figure 18:
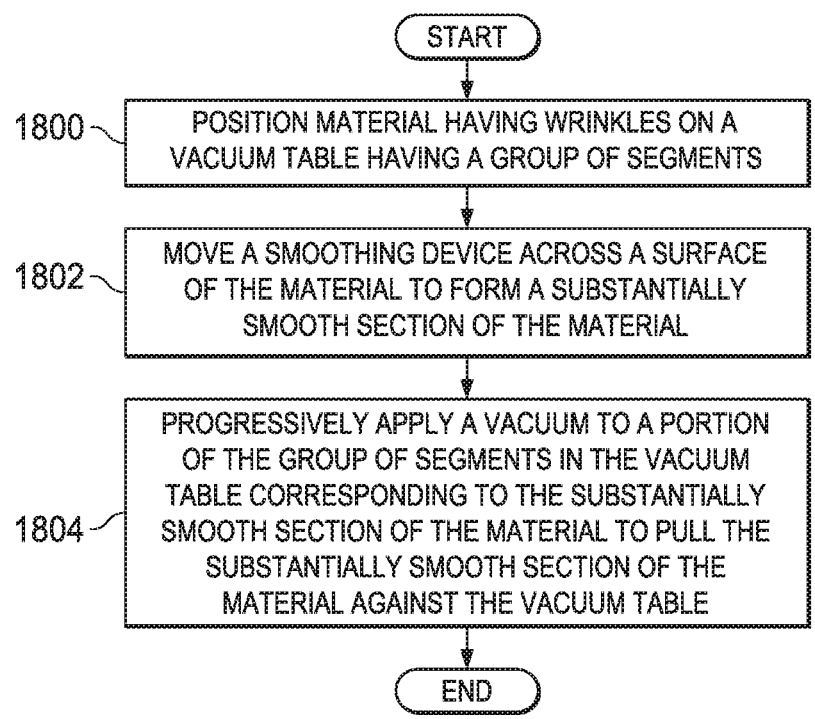
FIG. 18 is an illustration of a flowchart of a process for smoothing a material having wrinkles in accordance with an illustrative embodiment.

With reference now to FIG. 18, an illustration of a flowchart of a process for smoothing a material having wrinkles is depicted in accordance with an illustrative embodiment. The process shown in FIG. 18 may be implemented using automated smoothing system 1730 to smooth material 1720 in FIG. 17. The process shown in FIG. 18 may be implemented using automated smoothing system 102 shown in FIGS. 1-16 to smooth material 103 having wrinkles 104.

The process begins by positioning a material having wrinkles on a vacuum table having a group of segments (operation 1800). The material having wrinkles may be precut and placed on the vacuum table as a sheet in an illustrative example. In another illustrative example, the material having wrinkles may be unrolled from a roll.

Next, the process moves a smoothing device across a surface of the material to form a substantially smooth section of the material (operation 1802). The smoothing device may include at least one of a brush and an air knife.

The process progressively applies a vacuum to a portion of the group of segments in the vacuum table corresponding to the substantially smooth section of the material to pull the substantially smooth section of the material against the vacuum table (operation 1804). Afterwards, the process terminates. In operation 1804, a vacuum may be applied to each segment in the group of segments in the vacuum table immediately, or nearly immediately, after the smoothing device moves across the surface of the material corresponding to the segment. In this manner, segments of the vacuum table are activated, one at a time, to progressively pull down already smooth sections of the material. The vacuum may be pulled through a porous material over the group of segments such that the substantially smooth section of the material is pulled against the porous material of the vacuum table.

Figure 19:
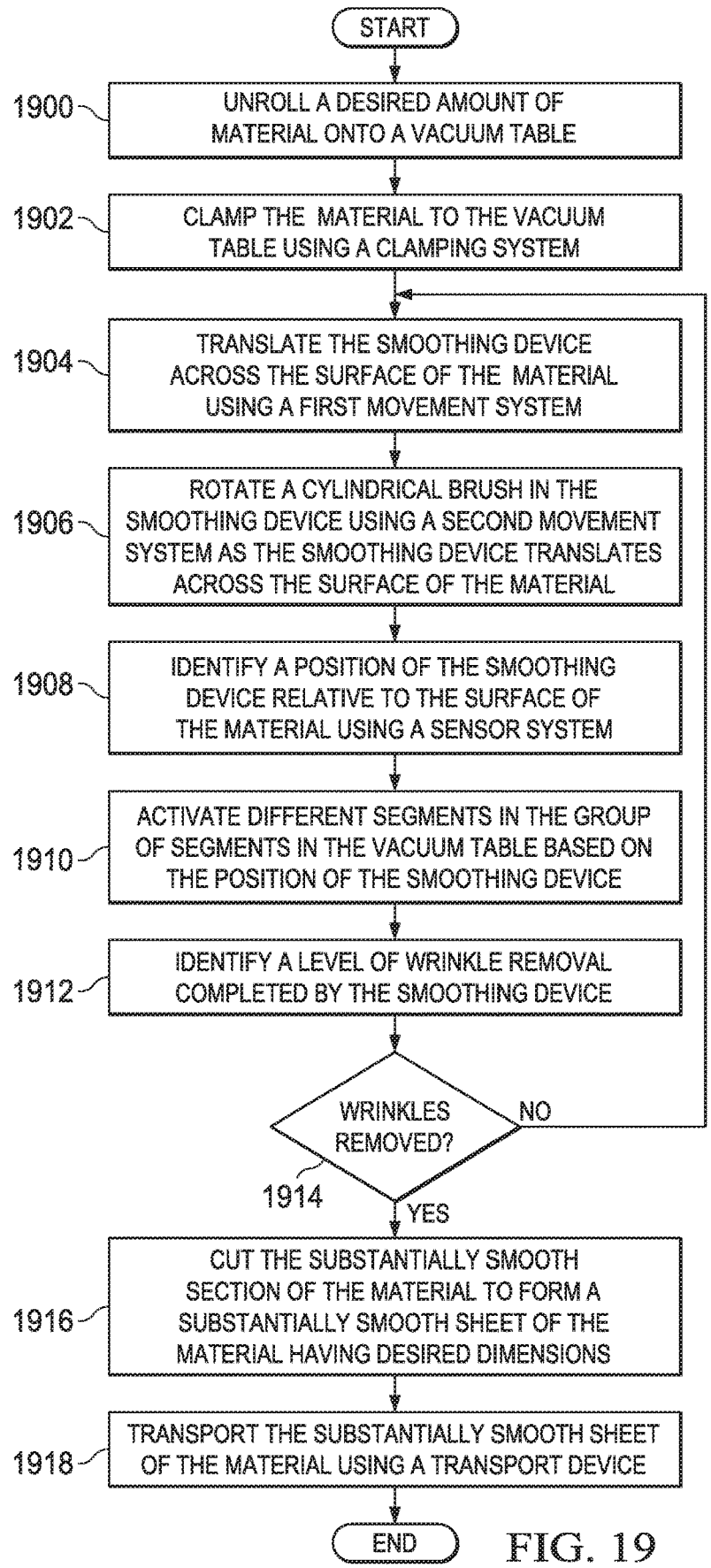
FIG. 19 is an illustration of a more-detailed flowchart of a process for smoothing a material having wrinkles in accordance with an illustrative embodiment.

Turning to FIG. 19, an illustration of a process for smoothing a material having wrinkles is depicted in accordance with an illustrative embodiment. The process illustrated in FIG. 19 may be implemented by automated smoothing system 1730 shown in FIG. 17. The process shown in FIG. 19 may be implemented using automated smoothing system 102 shown in FIGS. 1-16 to smooth material 103 having wrinkles 104.

The process begins by unrolling a desired amount of material onto a vacuum table (operation 1900). The material may have wrinkles or other imperfections after being rolled out on the vacuum table. The material may be material 103 of FIGS. 1-16.

Next, the process clamps the material to the vacuum table using a clamping system (operation 1902). In some illustrative examples, the material may be clamped to the vacuum table using clamping system 204 of FIG. 2.

Thereafter, the process translates the smoothing device across the surface of the material using a first movement system (operation 1904). The material is held against the vacuum table using the clamping system while the smoothing device moves across the surface of the material to remove the wrinkles from the material. In some examples, a brush system may translate across the surface of the material from the clamped edge of the material to the free edge of the material, removing wrinkles along the way. In other words, in these examples, a brush system may translate across the surface of the material from a first edge of the material to a second edge of the material using a first movement system.

The process rotates a cylindrical brush in the smoothing device using a second movement system as the smoothing device translates across the surface of the material (operation 1906). Concurrently with operation 1904 and operation 1906, the process identifies a position of the smoothing device relative to the surface of the material using a sensor system (operation 1908).

The process then activates different segments in the group of segments in the vacuum table based on the position of the smoothing device (operation 1910). In this illustrative example, each segment is activated immediately after the smoothing device moves across the surface over that particular segment, however, other timing intervals are possible.

By activating the different segments, the material the smoothing device has translated across may be pulled against the vacuum table. In some illustrative examples, activating the different segments may be done by pulling a vacuum. Further, in some illustrative examples, a vacuum may be pulled through a porous material over the different segments such that the material the smoothing device has translated across is pulled against the porous material of the vacuum table.

Operations 1906-1910 remove wrinkles and other imperfections from the material to form a substantially smooth section of the material. Optionally, ionized air may be blown on the wrinkled material using a blower as the wrinkled material is smoothed. In some examples, ionized air may be blown on the material after being smoothed.

The process may identify a level of wrinkle removal completed by the smoothing device (operation 1912). For instance, a camera system or other vision system may use shadows cast on the material by these imperfections to determine the extent to which wrinkles have been removed from the material.

A determination is then made as to whether wrinkles have been removed as desired (operation 1914). If wrinkles have been removed as desired, the process cuts the substantially smooth section of the material to form a substantially smooth sheet of the material having desired dimensions (operation 1916). Thereafter, the process transports the substantially smooth sheet of the material using a transport device (operation 1918). Afterwards, the process terminates. The substantially smooth sheet of the material may be transported to a different location for further processing or for use in forming a structure.

Returning to operation 1914, if wrinkles have not been removed as desired, the process returns to operation 1904, as described above. In some cases, after operation 1918, the process may return to operation 1900 to begin preparing another sheet of material. In this manner, the process described in FIG. 19 provides consistent, automated smoothing for wrinkled material.

Figure 20:
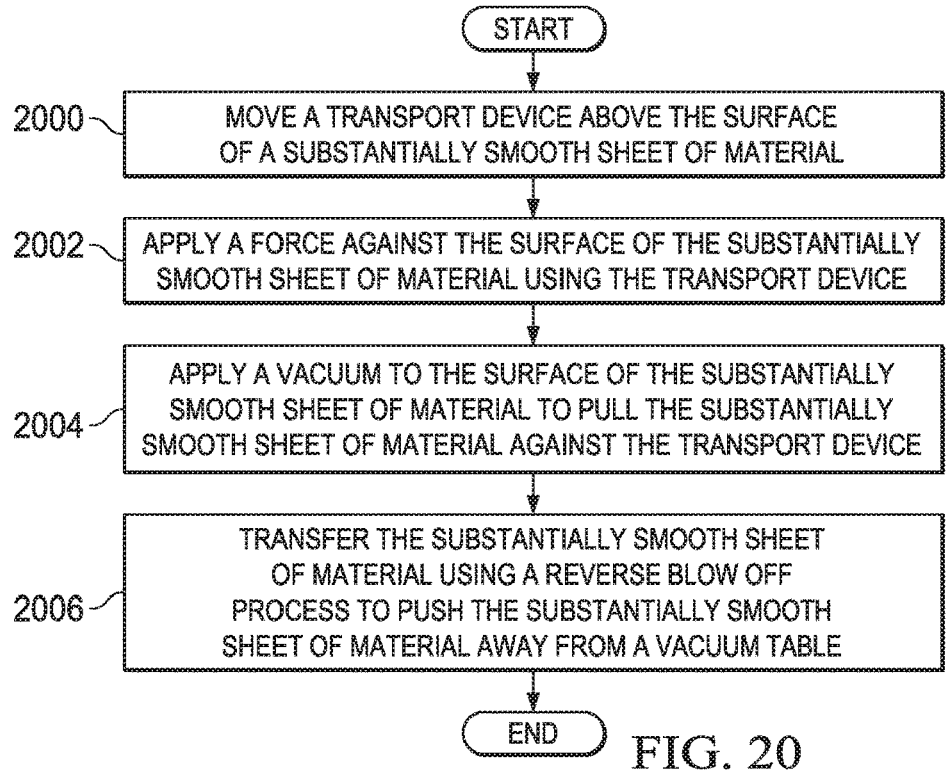
FIG. 20 is an illustration of a flowchart of a process for transporting a substantially smooth sheet of material in accordance with an illustrative embodiment.

In FIG. 20, an illustration of a flowchart of a process for transporting a substantially smooth sheet of material is depicted in accordance with an illustrative embodiment. The process illustrated in FIG. 20 may be implemented during operation 1918 in FIG. 19 using various tools in manufacturing system 1706 in FIG. 17.

The process begins by moving a transport device above the surface of the substantially smooth sheet of material (operation 2000). Next, the process applies a force against the surface of the substantially smooth sheet of material using the transport device (operation 2002). For instance, a transport device may press its end effector against the surface of the smooth sheet of material.

Thereafter, a vacuum is applied to the surface of the substantially smooth sheet of material to pull the substantially smooth sheet of material against the transport device (operation 2004). In operation 2004, a separate vacuum system associated with the transport device may be used to temporarily attach the substantially smooth sheet of material to the end effector of the transport device.

The process then transfers the substantially smooth sheet of material using a reverse blow off process to push the substantially smooth sheet of material away from a vacuum table (operation 2006). Afterwards the process terminates. In operation 2006, a puff of air may be used to separate the substantially smooth sheet of material from the vacuum table.

Figure 21:
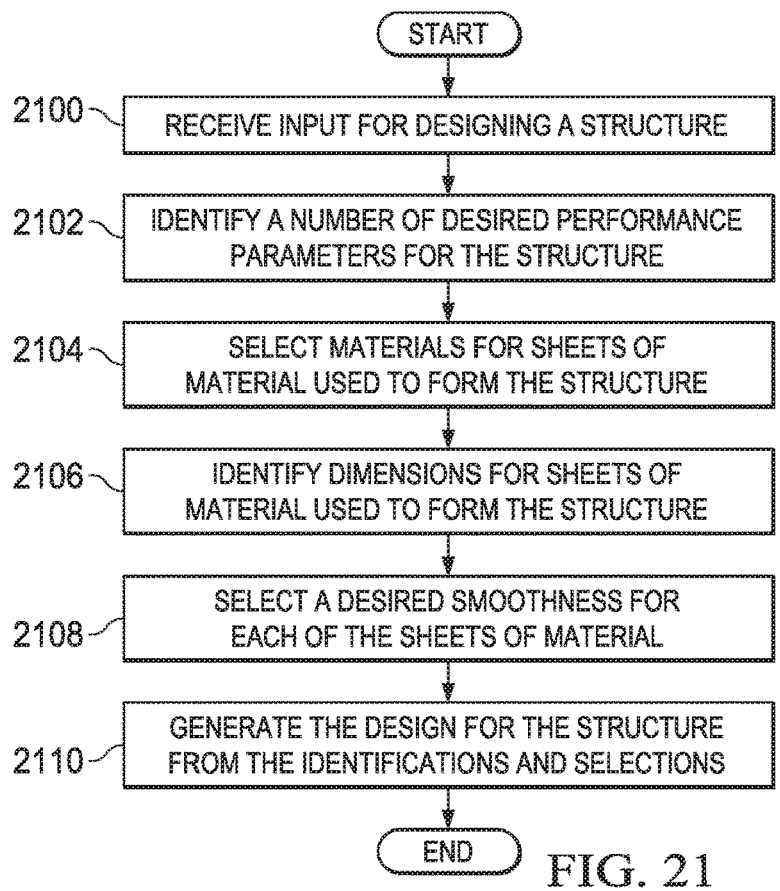
FIG. 21 is an illustration of a flowchart of a process for designing a structure in accordance with an illustrative embodiment.

Turning next to FIG. 21, an illustration of a flowchart of a process for designing a structure is depicted in accordance with an illustrative embodiment. The process illustrated in FIG. 21 may be used to generate a design for manufacturing structure 1704 shown in FIG. 17. The process in FIG. 21 may be implemented in designer 1708 in FIG. 17.

The process begins by receiving input for designing a structure (operation 2100). This input may include, for example, a number of desired performance parameters and other suitable types of input.

Thereafter, the process identifies a number of desired performance parameters for the structure (operation 2102). The process then selects materials for sheets of material used to form the structure (operation 2104).

The process also identifies dimensions for sheets of material used to form the structure (operation 2106). Next, the process selects a desired smoothness for each of the sheets of material (operation 2108). The process then generates the design for the structure from the identifications and selections (operation 2110), with the process terminating thereafter. This design may be used to generate instructions for an automated smoothing system to smooth sheets of material used to form the structure.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of module, a segment, a function, or a portion a combination thereof of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Thus, the illustrative embodiments provide an automated system and method for smoothing material 103 having wrinkles 104. Material 103 is positioned on vacuum table 200. Vacuum table 200 has group of segments 300. Smoothing device 202 is moved across surface 107 of material 103 to form substantially smooth section 1302 of material 103. A vacuum is progressively applied to a portion of group of segments 300 in vacuum table 200 corresponding to substantially smooth section 1302 of material 103 to pull substantially smooth section 1302 of material 103 against vacuum table 200.

With the use of an illustrative embodiment, the need for human operators to manually flatten wrinkled material may be reduced or eliminated. As a result, labor hours are reduced and significant cost savings may be realized.

Moreover, automated smoothing processes conducted in accordance with an illustrative embodiment save time and smooth wrinkled material more quickly than some currently used methods. Because the smoothing process is faster, manufacturing processes using the smoothed material may be implemented more quickly, resulting in a higher production rate within a facility.

The progressive operation of the vacuum table works to eliminate the problems associated with creases in the material caused by the material just sitting on a table with a vacuum. The progressive operation of the vacuum table also minimizes issues associated with stretching the material as it is pulled to the table. The wrinkles in the material are pulled out as the rotating brush advances and the vacuum sections turn on to hold the material in a flat condition. In this manner, an automated smoothing system in accordance with an illustrative embodiment may be adapted for various types of material and thicknesses of material. This adaptation may occur under the coordinated control of a single system controller that dynamically adjusts various components within the automated smoothing system to smooth the wrinkled sheet of material as desired.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a vacuum table having a group of segments, wherein a material having wrinkles is positioned on the vacuum table;
a smoothing device that moves across a surface of the material to form a substantially smooth section of the material; and
a vacuum system that progressively applies a vacuum to a portion of the group of segments in the vacuum table to pull the substantially smooth section of the material against the vacuum table.

2. The apparatus of claim 1 further comprising:
a clamping system that clamps the material to the vacuum table and holds the material against the vacuum table while the smoothing device moves across the surface of the material to remove the wrinkles from the material.

3. The apparatus of claim 1 further comprising:
a sensor system that identifies a position of the smoothing device relative to the surface of the material.

4. The apparatus of claim 3, further comprising:
a controller that activates different segments in the group of segments in the vacuum table based on the position of the smoothing device,
wherein the sensor system provides position feedback to the controller.

5. The apparatus of claim 1 further comprising:
a movement system that moves the smoothing device across the surface of the material, wherein the vacuum is applied to a segment in the group of segments in the vacuum table immediately after the smoothing device moves across the surface of the material corresponding to the segment.

6. The apparatus of claim 1, further comprising:
a first movement system that retracts the smoothing device after the substantially smooth section is formed.

7. An apparatus comprising:
a vacuum table having a group of segments, wherein a material having wrinkles is positioned on the vacuum table;
a smoothing device that moves across a surface of the material to form a substantially smooth section of the material; and
a vacuum system that progressively applies a vacuum to a portion of the group of segments in the vacuum table to pull the substantially smooth section of the material against the vacuum table,
wherein the smoothing device comprises a cylindrical brush having helically wound bristles.

8. The apparatus of claim 7, further comprising:
a second movement system that rotates the cylindrical brush as the cylindrical brush translates across the surface of the material.

9. The apparatus of claim 1, further comprising:
a transport device that transports the substantially smooth section.

10. The apparatus of claim 1, further comprising:
a substantially smooth sheet formed by cutting the substantially smooth section of the material to desired dimensions.

11. The apparatus of claim 10, wherein the apparatus transfers the substantially smooth sheet using a reverse blow off process to push the substantially smooth sheet away from the vacuum table.

12. The apparatus of claim 10, further comprising:
a transport device that transports the substantially smooth sheet.

13. The apparatus of claim 1, further comprising:
a blower device for blowing ionized air on the material using a blower.

14. The apparatus of claim 1, further comprising:
a vision system that identifies a level of wrinkle removal.

15. An apparatus comprising:

a vacuum table having a group of segments, wherein a material having wrinkles is positioned on the vacuum table;

a smoothing device that moves across a surface of the material to form a substantially smooth section of the material;

a vacuum system that progressively applies a vacuum to a portion of the group of segments in the vacuum table to pull the substantially smooth section of the material against the vacuum table;

a clamping system that clamps the material to the vacuum table and holds the material against the vacuum table while the smoothing device moves across the surface of the material to remove the wrinkles from the material;

a sensor system that identifies a position of the smoothing device relative to the surface of the material; and a controller that activates different segments in the group of segments in the vacuum table based on the position of the smoothing device.

16. The apparatus of claim 15 further comprising:

a vision system that identifies a level of wrinkle removal in the material;

the vision system including a camera.

17. The apparatus of claim 15 further comprising:

a movement system that moves the smoothing device across the surface of the material, wherein the vacuum is applied to a segment in the group of segments in the vacuum table immediately after the smoothing device moves across the surface of the material corresponding to the segment.

18. The apparatus of claim 15, further comprising:

a blower device for blowing ionized air on the material using a blower.

19. The apparatus of claim 15, further comprising:

a substantially smooth sheet formed by cutting the substantially smooth section of the material to desired dimensions.

20. The apparatus of claim 19, wherein the apparatus transfers the substantially smooth sheet using a reverse blow off process to push the substantially smooth sheet away from the vacuum table.

\* \* \* \* \*